(12) United States Patent
Cardona et al.

(10) Patent No.: US 12,423,755 B2
(45) Date of Patent: Sep. 23, 2025

(54) AUGMENTED REALITY SYSTEM TO PROVIDE RECOMMENDATION TO REPAIR OR REPLACE AN EXISTING DEVICE TO IMPROVE HOME SCORE

(71) Applicant: STATE FARM MUTUAL AUTOMOBILE INSURANCE COMPANY, Bloomington, IL (US)

(72) Inventors: Alexander Cardona, Gilbert, AZ (US); Arsh Singh, Frisco, TX (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 98 days.

(21) Appl. No.: 18/372,551

(22) Filed: Sep. 25, 2023

(65) Prior Publication Data

US 2024/0338904 A1    Oct. 10, 2024

Related U.S. Application Data

(60) Provisional application No. 63/535,363, filed on Aug. 30, 2023, provisional application No. 63/534,630, (Continued)

(51) Int. Cl.
*G06Q 40/08* (2012.01)
*G06N 20/00* (2019.01)
(Continued)

(52) U.S. Cl.
CPC ............. *G06Q 40/08* (2013.01); *G06N 20/00* (2019.01); *G06Q 10/0635* (2013.01);
(Continued)

(58) Field of Classification Search
None
See application file for complete search history.

(56) References Cited

U.S. PATENT DOCUMENTS 3,898,746 A    8/1975    Seidle
5,269,687 A    12/1993   Mott et al.
(Continued)

FOREIGN PATENT DOCUMENTS

AU    2015100551 A4    5/2015
CN    105751960 A      7/2016
(Continued)

OTHER PUBLICATIONS

Non-final Office Action, U.S. Appl. No. 17/874,096, mailed Feb. 9, 2023.
(Continued)

*Primary Examiner* — Tapas Mazumder
(74) *Attorney, Agent, or Firm* — MARSHALL, GERSTEIN & BORUN LLP

(57) ABSTRACT

Systems and methods disclosed herein relates generally to using augmented reality (AR) for visualizing recommended updates to devices proximate a structure. In some examples, underlay layer data may be received (e.g., from a camera of an AR viewer device); and overlay layer data may be received (e.g., from a different camera or other overlay layer device). An AR display may be created by correlating the underlay layer data with the overlay layer data. An improved home score indicia may be displayed based upon the recommended update.

20 Claims, 9 Drawing Sheets

Related U.S. Application Data filed on Aug. 25, 2023, provisional application No. 63/534,415, filed on Aug. 24, 2023, provisional application No. 63/533,184, filed on Aug. 17, 2023, provisional application No. 63/530,605, filed on Aug. 3, 2023, provisional application No. 63/524,343, filed on Jun. 30, 2023, provisional application No. 63/524,336, filed on Jun. 30, 2023, provisional application No. 63/524,342, filed on Jun. 30, 2023, provisional application No. 63/471,868, filed on Jun. 8, 2023, provisional application No. 63/465,004, filed on May 9, 2023, provisional application No. 63/458,289, filed on Apr. 10, 2023.

(51) Int. Cl.
  *G06Q 10/0635* (2023.01)
  *G06Q 10/20* (2023.01)
  *G06Q 30/02* (2023.01)
  *G06Q 30/0601* (2023.01)
  *G06Q 50/16* (2012.01)
  *G06T 19/00* (2011.01)

(52) U.S. Cl.
  CPC ......... *G06Q 10/20* (2013.01); *G06Q 30/0278* (2013.01); *G06Q 30/0631* (2013.01); *G06Q 50/16* (2013.01); *G06T 19/00* (2013.01); *G06T 19/006* (2013.01); *G06T 2219/004* (2013.01)

(56) References Cited

U.S. PATENT DOCUMENTS

| | | |
|---|---|---|
| 5,354,202 A | 10/1994 | Moncrief et al. |
| 5,577,913 A | 11/1996 | Moncrief et al. |
| 6,763,325 B1 | 7/2004 | Stone |
| 7,289,965 B1 | 10/2007 | Bradley et al. |
| 7,565,230 B2 | 7/2009 | Gardner et al. |
| 7,835,919 B1 | 11/2010 | Bradley et al. |
| 7,966,203 B1 | 6/2011 | Pietrzak |
| 8,010,377 B1 | 8/2011 | Bradley et al. |
| 8,027,850 B1 | 9/2011 | Pietrzak |
| 8,297,977 B2 | 10/2012 | Freund |
| 8,335,644 B2 | 12/2012 | Kimura |
| 8,433,344 B1 | 4/2013 | Virga |
| 8,650,048 B1 | 2/2014 | Hopkins, III et al. |
| 8,655,595 B1 | 2/2014 | Green et al. |
| 8,682,682 B1 | 3/2014 | Bradley et al. |
| 8,712,805 B1 | 4/2014 | Ferries et al. |
| 8,760,285 B2 | 6/2014 | Billman et al. |
| 9,057,746 B1 | 6/2015 | Houlette et al. |
| 9,152,737 B1 | 10/2015 | Micali et al. |
| 9,213,994 B2 | 12/2015 | Green et al. |
| 9,349,300 B2 | 5/2016 | Harkness |
| 9,443,195 B2 | 9/2016 | Micali et al. |
| 9,555,803 B2 | 1/2017 | Pawlicki et al. |
| 9,583,017 B2 | 2/2017 | Nepomuceno |
| 9,609,003 B1 | 3/2017 | Chmielewski et al. |
| 9,699,529 B1 | 7/2017 | Petri et al. |
| 9,712,741 B2 | 7/2017 | Kothari |
| 9,739,813 B2 | 8/2017 | Houlette et al. |
| 9,798,979 B2 | 10/2017 | Fadell et al. |
| 9,800,958 B1 | 10/2017 | Petri et al. |
| 9,830,748 B2 | 11/2017 | Rosenbaum |
| 9,942,630 B1 | 4/2018 | Petri et al. |
| 9,990,782 B2 | 6/2018 | Rosenbaum |
| 9,996,882 B1 | 6/2018 | Manzella et al. |
| 10,055,793 B1 | 8/2018 | Call et al. |
| 10,062,118 B1 | 8/2018 | Bernstein et al. |
| 10,102,584 B1 | 10/2018 | Devereaux et al. |
| 10,102,589 B1 | 10/2018 | Tofte et al. |
| 10,142,394 B2 | 11/2018 | Chmielewski et al. |
| 10,198,771 B1 | 2/2019 | Madigan et al. |
| 10,223,751 B1 | 3/2019 | Hutchinson et al. |
| 10,229,394 B1 | 3/2019 | Davis et al. |
| 10,242,500 B2 | 3/2019 | Tommy et al. |
| 10,269,190 B2 | 4/2019 | Rosenbaum |
| 10,296,978 B1 | 5/2019 | Corder et al. |
| 10,297,129 B2 * | 5/2019 | Piccolo, III ......... G06Q 50/265 |
| 10,306,303 B2 | 5/2019 | Bhageria et al. |
| 10,332,059 B2 | 6/2019 | Matsuoka et al. |
| 10,387,966 B1 | 8/2019 | Shah et al. |
| 10,431,023 B1 | 10/2019 | Watson et al. |
| 10,453,149 B1 | 10/2019 | Gaudin et al. |
| 10,462,426 B2 | 10/2019 | Schofield et al. |
| 10,467,824 B2 | 11/2019 | Rosenbaum |
| 10,469,282 B1 | 11/2019 | Konrardy et al. |
| 10,475,350 B1 | 11/2019 | Nepomuceno |
| 10,572,947 B1 | 2/2020 | Berends et al. |
| 10,586,177 B1 | 3/2020 | Choueiter et al. |
| 10,623,509 B2 | 4/2020 | Delinselle et al. |
| 10,637,683 B2 | 4/2020 | Funk et al. |
| 10,664,922 B1 | 5/2020 | Madigan et al. |
| 10,672,081 B1 | 6/2020 | Lyons et al. |
| 10,699,346 B1 | 6/2020 | Corder et al. |
| 10,699,348 B1 | 6/2020 | Devereaux et al. |
| 10,732,627 B1 | 8/2020 | Roberson et al. |
| 10,735,829 B2 | 8/2020 | Petri et al. |
| 10,740,691 B2 | 8/2020 | Choueiter et al. |
| 10,750,252 B2 | 8/2020 | Petri et al. |
| 10,796,557 B2 | 10/2020 | Sundermeyer et al. |
| 10,802,477 B1 | 10/2020 | Konrardy et al. |
| 10,804,700 B2 | 10/2020 | Cohen et al. |
| 10,818,105 B1 | 10/2020 | Konrardy et al. |
| 10,861,115 B1 | 12/2020 | Stricker et al. |
| 10,907,844 B2 | 2/2021 | Ribbich et al. |
| 10,930,141 B2 | 2/2021 | De Paz Alberola et al. |
| 10,943,306 B1 | 3/2021 | Gaudin et al. |
| 11,003,334 B1 | 5/2021 | Conway et al. |
| 11,037,255 B1 | 6/2021 | Ganev et al. |
| 11,049,189 B2 | 6/2021 | Shah et al. |
| 11,055,797 B1 | 7/2021 | Carone |
| 11,087,347 B1 | 8/2021 | De et al. |
| 11,087,420 B1 | 8/2021 | Trundle |
| 11,100,594 B1 | 8/2021 | West et al. |
| 11,151,654 B2 | 10/2021 | Trainor et al. |
| 11,164,257 B1 | 11/2021 | Devereaux et al. |
| 11,210,741 B1 | 12/2021 | Allen et al. |
| 11,227,452 B2 | 1/2022 | Rosenbaum |
| 11,232,873 B1 | 1/2022 | Aspro et al. |
| 11,277,465 B2 | 3/2022 | Chmielewski et al. |
| 11,308,247 B2 | 4/2022 | McDade |
| 11,348,193 B1 | 5/2022 | Konrardy et al. |
| 11,407,410 B2 | 8/2022 | Rosenbaum |
| 11,417,212 B1 | 8/2022 | Farooqui et al. |
| 11,430,076 B1 * | 8/2022 | Martin ................... G06Q 50/16 |
| 11,501,100 B1 | 11/2022 | Geng et al. |
| 11,524,707 B2 | 12/2022 | Rosenbaum |
| 11,594,083 B1 | 2/2023 | Rosenbaum |
| 11,656,097 B2 | 5/2023 | Vega et al. |
| 11,715,074 B2 | 8/2023 | Aspro et al. |
| 11,748,817 B2 | 9/2023 | Szott |
| 11,783,423 B1 | 10/2023 | Yager et al. |
| 11,941,712 B2 | 3/2024 | Trundle |
| 2004/0158476 A1 | 8/2004 | Blessinger et al. |
| 2006/0040239 A1 | 2/2006 | Cummins et al. |
| 2007/0268158 A1 | 11/2007 | Gunderson et al. |
| 2008/0051997 A1 | 2/2008 | Rosenberg |
| 2008/0102809 A1 | 5/2008 | Beyer |
| 2008/0254417 A1 | 10/2008 | Mohamed |
| 2008/0255862 A1 | 10/2008 | Bailey et al. |
| 2009/0265193 A1 | 10/2009 | Collins et al. |
| 2010/0097240 A1 | 4/2010 | Soulchin et al. |
| 2010/0207751 A1 | 8/2010 | Follmer et al. |
| 2010/0253540 A1 | 10/2010 | Seder et al. |
| 2011/0166777 A1 | 7/2011 | Chavakula |
| 2011/0270773 A1 | 11/2011 | Siekman et al. |
| 2011/0295624 A1 | 12/2011 | Chapin et al. |
| 2012/0072239 A1 | 3/2012 | Gibbard et al. |
| 2012/0295230 A1 | 11/2012 | Esposito |
| 2014/0136242 A1 | 5/2014 | Weekes et al. |
| 2014/0186810 A1 | 7/2014 | Falash et al. |
| 2014/0220513 A1 | 8/2014 | Harkness |
| 2014/0247160 A1 | 9/2014 | Glascock |

(56) References Cited

U.S. PATENT DOCUMENTS

| | | |
|---|---|---|
| 2014/0266669 A1 | 9/2014 | Fadell et al. |
| 2014/0327772 A1 | 11/2014 | Sahba |
| 2014/0358592 A1 | 12/2014 | Wedig et al. |
| 2015/0019262 A1 | 1/2015 | Du et al. |
| 2015/0035862 A1 | 2/2015 | Fischer et al. |
| 2015/0050623 A1 | 2/2015 | Falash et al. |
| 2015/0061859 A1 | 3/2015 | Matsuoka et al. |
| 2015/0104757 A1 | 4/2015 | Moncrief et al. |
| 2015/0187224 A1 | 7/2015 | Moncrief et al. |
| 2015/0347910 A1 | 12/2015 | Fadell et al. |
| 2016/0005313 A1 | 1/2016 | Cholayil |
| 2016/0048934 A1 | 2/2016 | Gross |
| 2016/0054452 A1 | 2/2016 | Cosatto et al. |
| 2016/0054735 A1 | 2/2016 | Switkes et al. |
| 2016/0055594 A1 | 2/2016 | Emison |
| 2016/0075332 A1 | 3/2016 | Edo-Ros |
| 2016/0163063 A1 | 6/2016 | Ashman |
| 2016/0193961 A1 | 7/2016 | Fischer et al. |
| 2016/0232802 A1 | 8/2016 | Nomura et al. |
| 2016/0275633 A1 | 9/2016 | Gitt et al. |
| 2016/0293037 A1 | 10/2016 | Jacques et al. |
| 2016/0293049 A1 | 10/2016 | Monahan et al. |
| 2016/0321587 A1 | 11/2016 | Gitt et al. |
| 2016/0360364 A1 | 12/2016 | Lin |
| 2017/0109715 A1 | 4/2017 | Aguirre et al. |
| 2017/0264890 A1 | 9/2017 | Gorilovsky et al. |
| 2017/0273552 A1 | 9/2017 | Leung et al. |
| 2017/0294135 A1 | 10/2017 | Lechner |
| 2018/0033087 A1 | 2/2018 | Delinselle et al. |
| 2018/0059779 A1 | 3/2018 | Sisbot et al. |
| 2018/0061138 A1 | 3/2018 | Neeter |
| 2018/0118219 A1 | 5/2018 | Hiei et al. |
| 2018/0239948 A1 | 8/2018 | Rutschman et al. |
| 2018/0279032 A1 | 9/2018 | Boesen |
| 2018/0308024 A1 | 10/2018 | Kilner et al. |
| 2018/0311085 A1 | 11/2018 | Lacaze et al. |
| 2018/0374268 A1 | 12/2018 | Niles |
| 2019/0043201 A1 | 2/2019 | Strong et al. |
| 2019/0043351 A1 | 2/2019 | Yang et al. |
| 2019/0107845 A1 | 4/2019 | Kaine |
| 2019/0108768 A1 | 4/2019 | Mohamed |
| 2019/0187876 A1 | 6/2019 | Platt et al. |
| 2019/0251520 A1 | 8/2019 | Bentley, III et al. |
| 2019/0304188 A1 | 10/2019 | Bridgeman et al. |
| 2020/0003902 A1 | 1/2020 | Lee |
| 2020/0086806 A1 | 3/2020 | Cha |
| 2020/0128178 A1 | 4/2020 | Shi |
| 2020/0258306 A1 | 8/2020 | Forutanpour et al. |
| 2020/0264003 A1 | 8/2020 | Ebner et al. |
| 2020/0339160 A1 | 10/2020 | Rosenbaum |
| 2020/0372791 A1 | 11/2020 | Li et al. |
| 2021/0011448 A1 | 1/2021 | Coleman et al. |
| 2021/0018335 A1 | 1/2021 | Hood |
| 2021/0019847 A1 | 1/2021 | Sneed |
| 2021/0090188 A1 | 3/2021 | Lai et al. |
| 2021/0090300 A1 | 3/2021 | Leppänen et al. |
| 2021/0133929 A1 | 5/2021 | Ackerson et al. |
| 2021/0150651 A1 | 5/2021 | Shoup |
| 2021/0182986 A1 | 6/2021 | Butler et al. |
| 2021/0232140 A1* | 7/2021 | Bart .................. H04N 23/74 |
| 2021/0237645 A1 | 8/2021 | Farrell et al. |
| 2021/0248822 A1 | 8/2021 | Choi et al. |
| 2021/0278840 A1 | 9/2021 | Jaegal |
| 2021/0279791 A1 | 9/2021 | Jacoby |
| 2021/0279811 A1 | 9/2021 | Waltman et al. |
| 2021/0312789 A1 | 10/2021 | Linn |
| 2021/0350471 A1 | 11/2021 | Hakimi-Boushehri et al. |
| 2021/0387821 A1 | 12/2021 | Kinzler |
| 2022/0020230 A1 | 1/2022 | Tal et al. |
| 2022/0065648 A1 | 3/2022 | Suleiman Ahmad Almousa |
| 2022/0065651 A1 | 3/2022 | Beaurepaire et al. |
| 2022/0092893 A1 | 3/2022 | Rosenbaum |
| 2022/0101275 A1 | 3/2022 | Aspro et al. |
| 2022/0215492 A1 | 7/2022 | McKenna, IV |
| 2022/0340148 A1 | 10/2022 | Rosenbaum |
| 2022/0343443 A1 | 10/2022 | Graham et al. |
| 2022/0391794 A1 | 12/2022 | Singh et al. |
| 2022/0397686 A1 | 12/2022 | Scacchi et al. |
| 2022/0405856 A1 | 12/2022 | Hedges et al. |
| 2023/0023808 A1 | 1/2023 | Wall et al. |
| 2023/0035517 A1 | 2/2023 | Bentley et al. |
| 2023/0060300 A1 | 3/2023 | Rosenbaum |
| 2023/0342732 A1 | 10/2023 | Aspro et al. |
| 2023/0342867 A1 | 10/2023 | Gibson et al. |
| 2023/0345100 A1 | 10/2023 | Reading et al. |
| 2024/0046366 A1 | 2/2024 | Yager et al. |
| 2024/0087290 A1 | 3/2024 | Hedges et al. |
| 2024/0257516 A1 | 8/2024 | Doken |
| 2024/0331071 A1* | 10/2024 | Ouellette ............... G08B 13/08 |

FOREIGN PATENT DOCUMENTS

| | | |
|---|---|---|
| CN | 111626536 A | 9/2020 |
| CN | 113138558 A | 7/2021 |
| CN | 114667474 A | 6/2022 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| JP | 2003157357 A | 5/2003 |
| KR | 20150129845 A | 11/2015 |
| WO | WO-2014159131 A2 | 10/2014 |
| WO | 2016/081511 A2 | 5/2016 |
| WO | 2018/052595 A1 | 3/2018 |
| WO | 2020/159244 A1 | 8/2020 |
| WO | 2020/218636 A1 | 10/2020 |
| WO | WO-2021087185 A1 | 5/2021 |

OTHER PUBLICATIONS

Final Office Action, U.S. Appl. No. 17/874,096, mailed Jun. 21, 2023.

Screenshots of Dwellin & vipHomeLink (2023).

OpenPR Worldwide Public Relations, Press release, Floatbot.AI Unveils Revolutioanry Agent M—Generative AI (LLM or ChatGPT) Based Master Agent developer framework, Web page downloaded from Internet at <https://www.openpr.com/news/3147235/floatbot-ai-unveils-revolutionary-agent-m-generative-ai-llm>. Retrieved from Internet on Aug. 1, 2023.

A. Javaheri et al., "Emerging Space Brief: Digital Twins" PitchBook, Jun. 8, 2023.

Jiang et al., Design and Implementation of Smart-Home Monitoring System with the Internet of Things Technology, Wireless Communications, Networking and Applications, Conference paper, (2015).

Michalis et al., Quality Evaluation of Residential Houses: The Development of a Real-Time Quality Assessment Tool, International Journal of Business Innovation and Research, 2(1):80-104 (2013).

Moore et al., An intelligent maintenance system for continuous cost-based prioritisation of maintenance activities, Computers in Industry, 57(6):595-606 (2006).

Spoor, How can data generated by smart home devices help identify consumer needs, 7th IBA Bachelor Thesis Conference, Jul. 1, 2016, Enschede, The Netherlands (2016).

Non-Final Rejection Mailed on Apr. 24, 2024 for U.S. Appl. No. 18/238,219, 10 page(s).

U.S. Appl. No. 17/874,227, Nonfinal Office Action, dated Dec. 29, 2023.

U.S. Appl. No. 17/874,227, Notice of Allowance, dated Apr. 18, 2024.

Non-Final Rejection Mailed on Jun. 3, 2025 for U.S. Appl. No. 18/372,573, 11 page(s).

Non-Final Rejection Mailed on May 23, 2025 for U.S. Appl. No. 18/372,520, 8 page(s).

(56) References Cited

OTHER PUBLICATIONS

Notice of Allowance and Fees Due (PTOL-85) Mailed on Jun. 9, 2025 for U.S. Appl. No. 17/874,096, 9 page(s).

* cited by examiner

Microwaves

| Brand | Model | Expected Lifespan | Maintenance | Recalls | Firmware Upgrades | Wattage | Importance |
|---|---|---|---|---|---|---|---|
| Kitchen Co. | RB132 | 8 years | None | No | No | 1000 | 0 |
| Kitchen Co. | RB142 | 8 years | None | Yes | No | 1200 | 90 |
| Chef Inc. | TRH155 | 10 years | None | No | No | 1000 | 0 |
| ### | ### | ### | ### | ### | ### | ### | ### |
| ### | ### | ### | ### | ### | ### | ### | ### |
| ### | ### | ### | ### | ### | ### | ### | ### |
| ### | ### | ### | ### | ### | ### | ### | ### |
| ### | ### | ### | ### | ### | ### | ### | ### |

Water Heaters

| Brand | Model | Expected Lifespan | Maintenance | Recalls | Capacity | Power Source | Importance |
|---|---|---|---|---|---|---|---|
| Home Corp. | T120 | 10 years | Annual flush | No | 50 gal. | Natural Gas | 20 |
| Thermal Co. | PD905 | 12 years | Annual flush | No | 50 gal. | Natural Gas | 20 |
| ### | ### | ### | ### | ### | ### | ### | ### |
| ### | ### | ### | ### | ### | ### | ### | ### |
| ### | ### | ### | ### | ### | ### | ### | ### |
| ### | ### | ### | ### | ### | ### | ### | ### |
| ### | ### | ### | ### | ### | ### | ### | ### |
| ### | ### | ### | ### | ### | ### | ### | ### |

| Type | Brand | Model | Age | Last Maintenance |
|---|---|---|---|---|
| Microwave | Kitchen Co. | RB142 | 2 years | None |
| Water Heater | Home Corp. | T120 | 12 years | 2 years ago |
| ### | ### | ### | ### | ### |
| ### | ### | ### | ### | ### |
| ### | ### | ### | ### | ### |
| ### | ### | ### | ### | ### |
| ### | ### | ### | ### | ### |
| ### | ### | ### | ### | ### |

630, 632, 634

AUGMENTED REALITY SYSTEM TO PROVIDE RECOMMENDATION TO REPAIR OR REPLACE AN EXISTING DEVICE TO IMPROVE HOME SCORE

CROSS REFERENCE TO RELATED APPLICATIONS

This application claims the benefit of U.S. Provisional Application No. 63/535,363 entitled "Machine Vision System to Purchase a New Device to Improve a Home Score" (filed Aug. 30, 2023), U.S. Provisional Application No. 63/534,630 entitled "Information System for Products to Improve a Home Score (filed Aug. 25, 2023), U.S. Provisional Application No. 63/534,415 entitled "Recommendation System for Upgrades or Services for a Home to Improve a Home Score" (filed Aug. 24, 2023), U.S. Provisional Application No. 63/533,184 entitled "Recommendation System to Replace or Repair an Existing Device to Improve a Home Score" (filed Aug. 17, 2023), U.S. Provisional Application No. 63/530,605 entitled "Recommendation System to Purchase a New Device to Improve a Home Score" (filed Aug. 3, 2023), U.S. Provisional Application No. 63/524,343 entitled "Virtual Reality Digital Twin of a Home" (filed Jun. 30, 2023), U.S. Provisional Application No. 63/524,342 entitled "Augmented Reality System to Provide Recommendation to Repair or Replace an Existing Device to Improve Home Score" (filed Jun. 30, 2023), U.S. Provisional Application No. 63/524,336 entitled "Augmented Reality System to Provide Recommendation to Purchase a Device That Will Improve Home Score" (filed Jun. 30, 2023), U.S. Provisional Application No. 63/471,868 entitled "Home Score Marketplace" (filed Jun. 8, 2023), U.S. Provisional Application No. 63/465,004 entitled "Home Score Marketplace" (filed May 9, 2023), and U.S. Provisional Application No. 63/458,289 entitled "Home Score Marketplace" (filed Apr. 10, 2023), the entirety of all eleven applications is incorporated by reference herein.

FIELD OF THE INVENTION

The present disclosure generally relates to recommending the repair or replacement of an existing device to improve a home score, including depicting the recommended repair or replacement and home score improvement.

BACKGROUND

Repairing or replacing devices within a home, business and/or other structure may be a valuable tool to mitigate and/or avoid losses to these structures, which may in turn lower insurance premiums. Homeowners, landowners, tenants, and/or other people associated with a structure may be unaware of the repair or replacement these devices require or the benefits of the repair or replacement. Further, these people may forget or be too busy to investigate and maintain existing devices. Conventional instructions accompanying these devices may be ineffective in educating people about the need to repair or replace these devices.

The conventional instructions may include additional ineffectiveness, inefficiencies, encumbrances, and/or other drawbacks.

SUMMARY

The present embodiments may relate to, inter alia, systems and methods for repairing, maintaining, and/or replacing existing devices proximate a structure using Augmented Reality (AR), including indications of the repair, maintenance, and/or replacement and a resulting home score improvement.

In one aspect, a computer-implemented method of using AR (or other display or display screen) for visualizing a recommended update to an existing device proximate a structure may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, and/or other electronic or electrical components, which may be in wired or wireless communication with one another. For example, in one instance, the computer-implemented method may include: (1) receiving, with one or more processors, underlay layer data indicative of a field of view associated with an AR viewer device, wherein the field of view comprises an existing device proximate the structure; (2) identifying, by a trained machine learning (ML) model using the one or more processors, the existing device in the underlay layer data; (3) determining, by the trained ML model using the one or more processors, the recommended update to the existing device; (4) calculating, by the trained ML model using the one or more processors, an improvement to a home score associated with the structure based upon the recommended update; (5) receiving, with the one or more processors, overlay layer data including an indication of the recommended update to the existing device and the improvement to the home score; (6) correlating, with the one or more processors, the overlay layer data with the underlay layer data; (7) creating, with the one or more processors, an AR display based upon the correlation, the AR display including the indication of the recommended update and the improvement to the home score; and/or (8) displaying, with the one or more processors, the AR display to a user via the AR viewer device. The method may include additional, less, or alternate functionality or actions, including those discussed elsewhere herein.

In another aspect, a computer system to use AR (or other display or display screen) to visualize a recommended update to an existing device proximate a structure may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, and/or other electronic or electrical components, which may be in wired or wireless communication with one another. For example, in one instance, the computer system may include one or more processors configured to: (1) receive underlay layer data indicative of a field of view associated with an AR viewer device, wherein the field of view comprises the existing device proximate the structure; (2) identify, by a trained machine learning (ML) model, the existing device in the underlay layer data; (3) determine, by the trained ML model, the recommended update to the existing device; (4) calculate, by the trained ML model, an improvement to a home score associated with the structure based upon the recommended update; (5) receive overlay layer data including an indication of the recommended update to the existing device and the improvement to the home score; (6) correlate the overlay layer data with the underlay layer data; (7) create an AR display based upon the correlation, the AR display including the indication of the recommended update and the improvement to the home score; and/or (8) display the AR display to a user via the AR viewer device. The computer system may include additional, less, or alternate functionality, including that discussed elsewhere herein.

In one aspect, a non-transitory computer-readable medium storing processor-executable instructions that, when executed by one or more processors, cause the one or more processors to: (1) receive underlay layer data indicative of a field of view associated with an AR viewer device, wherein the field of view comprises the existing device proximate the structure; (2) identify, by a trained machine learning (ML) model, the existing device in the underlay layer data; (3) determine, by the trained ML model, the recommended update to the existing device; (4) calculate, by the trained ML model, an improvement to a home score associated with the structure based upon the recommended update; (5) receive overlay layer data including an indication of the recommended update to the existing device and the improvement to the home score; (6) correlate the overlay layer data with the underlay layer data; (7) create an AR display based upon the correlation, the AR display including the indication of the recommended update and the improvement to the home score; and/or (8) display the AR display to a user via the AR viewer device. The instructions may direct additional, less, or alternate functionality, including that discussed elsewhere herein.

Additional, alternate and/or fewer actions, steps, features and/or functionality may be included in an aspect and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 6A depicts an exemplary dataset of devices, according to one embodiment.

FIG. 6B depicts exemplary information about existing devices, according to one embodiment.

Figure 1:
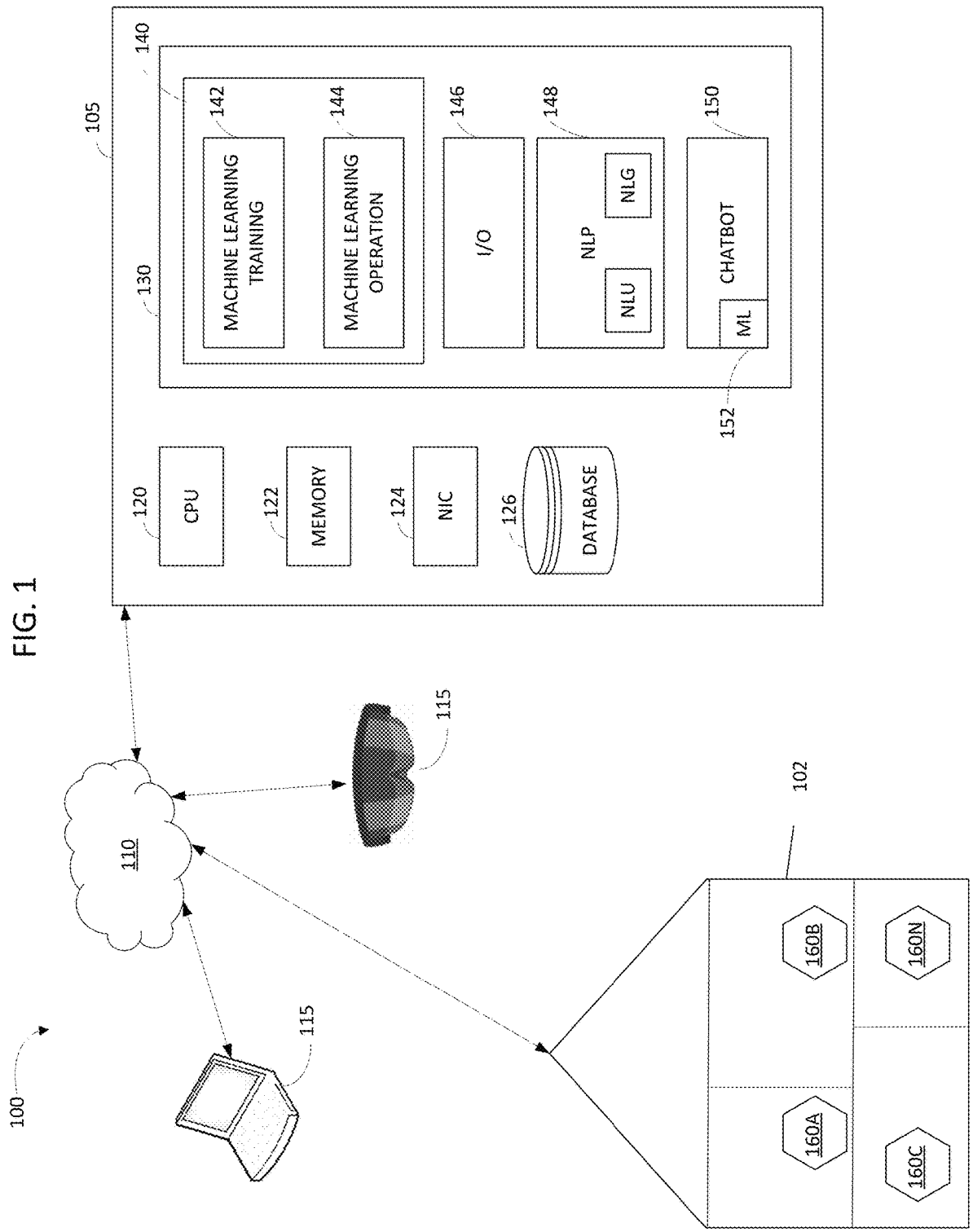
FIG. 1 depicts a block diagram of an exemplary computer environment in which methods and systems for providing recommended updates to devices proximate a structure are implemented.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for using Augmented Reality (AR) (or other displays, display screens, images, graphics, holographs, or electronic or computer displays) for visualizing updates to existing devices proximate a structure.

Some embodiments may use techniques to obtain existing device information for a structure. The existing device information may identification of existing devices proximate the structure, location of the existing devices with respect to the structure, and/or maintenance and/or update history of the existing devices.

Some embodiments may use techniques to obtain underlay layer data indicative of a field of view proximate a structure. The underlay layer data may be obtained by a camera coupled to an AR headset, a standalone camera, and/or any other image or video capture device. The underlay layer data may include the interior of a structure and/or the exterior of a structure, including existing devices proximate the structure.

The existing device information and/or underlay layer data may be provided to a trained ML model to generate an indication of the recommended updates to existing devices proximate the structure. The trained ML model may include a convolutional neural network, regression model, an algorithm such as k-nearest neighbor, support vector regression, and/or random forest.

The trained ML model may be trained using historical insurance claims data. The historical insurance claims data may indicate one or more of a type of loss (e.g., burglary, fire, water leak, etc.); a cause of the loss (e.g., leaking water heater, etc.); existing devices (e.g., smoke detectors, water heaters, etc.); amount of loss; and/or a type of structure where the loss occurred (e.g., single family home, condominium, garage, etc.), among other things. The trained ML model may be configured to learn a relationship between the presence of one or more updated devices and a reduction in the frequency and/or amount of losses.

The trained ML model may be trained using a device dataset. The device dataset may include information about categories of devices (e.g., water heaters, smoke detectors, etc.). The device dataset may include information about specific devices (e.g., brand, model, price, rating, warranty, features, etc.). The device dataset may include images of the devices. The device dataset may include information and/or images of devices available for sale and/or no longer for sale. The trained ML model may be configured to recognize existing and/or newly-placed devices in the underlay layer data.

The ML model may be configured to weigh one or more attributes of the existing device information and/or underlay layer data and/or determine a score associated with the potential sources of loss and rank the potential sources of loss.

The ML model may determine one or more recommended updates to devices proximate the structure. The ML model may also determine an increase in a home score for a structure corresponding to the recommended updates.

In some embodiments, generative AI models (also referred to as generative ML models) including voice bots and/or chatbots may be configured to utilize artificial intelligence and/or ML techniques. Data input into the voice bots, chatbots, or other bots may include historical insurance claim data, historical home data, device information, and other data. The data input into the bot or bots may include text, documents, and images, such as text, documents and images related to structures, claims, losses, and devices. In certain embodiments, a voice or chatbot may be a ChatGPT chatbot. The voice or chatbot may employ supervised or unsupervised ML techniques, which may be followed or used in conjunction with reinforced or reinforcement learning techniques. In one aspect, the voice or chatbot may employ the techniques utilized for ChatGPT. The voice bot, chatbot, ChatGPT-based bot, ChatGPT bot, and/or other such generative model may generate audible or verbal output, text or textual output, visual or graphical output, output for use with speakers and/or display screens, and/or other types of output for user and/or other computer or bot consumption.

As used herein, the term augmented reality (AR) may refer to generating digital content (i.e., an AR display) which is overlaid on a view of the user's physical environment via a display of a viewer device, such as on a transparent surface of a viewer device, such that a wearer/user of the AR viewer device (which may include AR glasses or headsets) is still able to view their physical environment. The AR display may include virtual images, text, models, sounds, animations, videos, instructions, multimedia and/or other digitally-generated content.

As used herein, the term "property owner" indicates any individual associated with the property, such as a person who owns the property, a family member of the person who owns the property, a person renting/subletting the property, a person living or working on the property, or any other individual that may have an interest in fixing damage to the property.

Further, any reference to "structure" is meant to be exemplary and not limiting. The systems and methods described herein may be applied to any structure and/or property, such as homes, businesses, offices, farms, lots, parks, garages, and/or other types of properties and/or buildings. Accordingly, "homeowner" may be used interchangeably with "property owner." As used herein, "property" may also refer to any land, foundation, buildings, belongings and/or equipment disposed upon the property itself.

As used herein, the term "update" indicates any change to an existing device, such as repair, maintenance, upgrade, reconfiguration, or replacement.

Exemplary Computer Environment

FIG. 1 depicts an exemplary environment 100 associated with recommending the update of one or more devices 160A-N proximate a structure, such as a home 102, to improve a home score. Although FIG. 1 depicts certain entities, components, equipment, and devices, it should be appreciated that additional or alternate entities, components, equipment, and devices are envisioned.

As illustrated in FIG. 1, the environment 100 may include in one aspect, one or more servers 105 which may perform functionalities such as recommending updates to devices 160A-N and calculating an improved home score. The server 105 may be part of a cloud network or may otherwise communicate with other hardware or software components within one or more cloud computing environments to send, retrieve, or otherwise analyze data or information described herein. For example, in certain aspects of the present techniques, the computing environment 100 may comprise an on-premise computing environment, a multi-cloud computing environment, a public cloud computing environment, a private cloud computing environment, and/or a hybrid cloud computing environment. For example, an entity (e.g., a business) may host one or more services in a public cloud computing environment (e.g., Alibaba Cloud, Amazon Web Services (AWS), Google Cloud, IBM Cloud, Microsoft Azure, etc.). The public cloud computing environment may be a traditional off-premise cloud (i.e., not physically hosted at a location owned/controlled by the business). Alternatively, or in addition, aspects of the public cloud may be hosted on-premise at a location owned/controlled by the business. The public cloud may be partitioned using visualization and multi-tenancy techniques and may include one or more infrastructure-as-a-service (IaaS) and/or platform-as-a-service (PaaS) services.

A network 110 may comprise any suitable network or networks, including a local area network (LAN), wide area network (WAN), Internet, or combination thereof. For example, the network 110 may include a wireless cellular service (e.g., 4G, 5G, 6G, etc.). Generally, the network 110 enables bidirectional communication between the servers 105, a user device 115 and one or more devices 160A-N. In one aspect, the network 110 may comprise a cellular base station, such as cell tower(s), communicating to the one or more components of the computing environment 100 via wired/wireless communications based upon any one or more of various mobile phone standards, including NMT, GSM, CDMA, UMTS, LTE, 5G, 6G, or the like. Additionally or alternatively, the network 110 may comprise one or more routers, wireless switches, or other such wireless connection points communicating to the components of the computing environment 100 via wireless communications based upon any one or more of various wireless standards, including by non-limiting example, IEEE 802.11a/b/g/n/ac/ax/be (Wi-Fi), Bluetooth, and/or the like.

The server 105 may include one or more processors 120. The processors 120 may include one or more suitable processors (e.g., central processing units (CPUs) and/or graphics processing units (GPUs)). The processors 120 may be connected to a memory 122 via a computer bus (not depicted) responsible for transmitting electronic data, data packets, or otherwise electronic signals to and from the processors 120 and memory 122 in order to implement or perform the machine-readable instructions, methods, processes, elements, or limitations, as illustrated, depicted, or described for the various flowcharts, illustrations, diagrams, figures, and/or other disclosure herein. The processors 120 may interface with the memory 122 via a computer bus to execute an operating system (OS) and/or computing instructions contained therein, and/or to access other services/aspects. For example, the processors 120 may interface with the memory 122 via the computer bus to create, read, update, delete, or otherwise access or interact with the data stored in the memory 122 and/or a database 126.

The memory 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 122 may store an operating system (OS) (e.g., Microsoft Windows, Linux, UNIX, MacOS, etc.) capable of facilitating the functionalities, apps, methods, or other software as discussed herein.

The memory 122 may store a plurality of computing modules 130, implemented as respective sets of computer-executable instructions (e.g., one or more source code libraries, trained ML models such as neural networks, convolutional neural networks, etc.) as described herein.

In general, a computer program or computer based product, application, or code (e.g., the model(s), such as ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 120 (e.g., working in connection with the respective operating system in memory 122) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The database 126 may be a relational database, such as Oracle, DB2, MySQL, a NoSQL based database, such as MongoDB, or another suitable database. The database 126 may store data that is used to train and/or operate one or more ML models, provide AR models/displays, among other things.

In one aspect, the computing modules 130 may include an ML module 140. The ML module 140 may include ML training module (MLTM) 142 and/or ML operation module (MLOM) 144. In some embodiments, at least one of a plurality of ML methods and algorithms may be applied by the ML module 140, which may include, but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of ML, such as supervised learning, unsupervised learning, and reinforcement learning.

In one aspect, the ML based algorithms may be included as a library or package executed on server(s) 105. For example, libraries may include the TensorFlow based library, the PyTorch library, the HuggingFace library, and/or the scikit-learn Python library.

In one embodiment, the ML module 140 employs supervised learning, which involves identifying patterns in existing data to make predictions about subsequently received data. Specifically, the ML module is "trained" (e.g., via MLTM 142) using training data, which includes example inputs and associated example outputs. Based upon the training data, the ML module 140 may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiments, a processing element may be trained by providing it with a large sample of data with known characteristics or features.

In another embodiment, the ML module 140 may employ unsupervised learning, which involves finding meaningful relationships in unorganized data. Unlike supervised learning, unsupervised learning does not involve user-initiated training based upon example inputs with associated outputs. Rather, in unsupervised learning, the ML module 140 may organize unlabeled data according to a relationship determined by at least one ML method/algorithm employed by the ML module 140. Unorganized data may include any combination of data inputs and/or ML outputs as described above.

In yet another embodiment, the ML module 140 may employ reinforcement learning, which involves optimizing outputs based upon feedback from a reward signal. Specifically, the ML module 140 may receive a user-defined reward signal definition, receive a data input, utilize a decision-making model to generate the ML output based upon the data input, receive a reward signal based upon the reward signal definition and the ML output, and alter the decision-making model so as to receive a stronger reward signal for subsequently generated ML outputs. Other types of ML may also be employed, including deep or combined learning techniques.

The MLTM 142 may receive labeled data at an input layer of a model having a networked layer architecture (e.g., an artificial neural network, a convolutional neural network, etc.) for training the one or more ML models. The received data may be propagated through one or more connected deep layers of the ML model to establish weights of one or more nodes, or neurons, of the respective layers. Initially, the weights may be initialized to random values, and one or more suitable activation functions may be chosen for the training process. The present techniques may include training a respective output layer of the one or more ML models. The output layer may be trained to output a prediction, for example.

The MLOM 144 may comprise a set of computer-executable instructions implementing ML loading, configuration, initialization and/or operation functionality. The MLOM 144 may include instructions for storing trained models (e.g., in the electronic database 126). As discussed, once trained, the one or more trained ML models may be operated in inference mode, whereupon when provided with de novo input that the model has not previously been provided, the model may output one or more predictions, classifications, etc., as described herein.

In operation, ML model training module 142 may access database 126 or any other data source for training data suitable to generate one or more ML models. The training data may be sample data with assigned relevant and comprehensive labels (classes or tags) used to fit the parameters (weights) of an ML model with the goal of training it by example. In one aspect, once an appropriate ML model is trained and validated to provide accurate predictions and/or responses, the trained model may be loaded into MLOM 144 at runtime to process input data and generate output data.

While various embodiments, examples, and/or aspects disclosed herein may include training and generating one or more ML models for the server 105 to load at runtime, it is also contemplated that one or more appropriately trained ML models may already exist (e.g., in database 126) such that the server 105 may load an existing trained ML model at runtime. It is further contemplated that the server 105 may retrain, update and/or otherwise alter an existing ML model and before loading the model at runtime.

In one aspect, the computing modules 130 may include an input/output (I/O) module 146, comprising a set of computer-executable instructions implementing communication functions. The I/O module 146 may include a communication component configured to communicate (e.g., send and receive) data via one or more external/network port(s) to one or more networks or local terminals, such as the computer network 110 and/or the user device 115 (for rendering or visualizing) described herein. In one aspect, the servers 105 may include a client-server platform technology such as ASP.NET, Java J2EE, Ruby on Rails, Node.js, a web service or online API, responsive for receiving and responding to electronic requests.

I/O module 146 may further include or implement an operator interface configured to present information to an administrator or operator and/or receive inputs from the administrator and/or operator. An operator interface may provide a display screen. The I/O module 146 may facilitate I/O components (e.g., ports, capacitive or resistive touch sensitive input panels, keys, buttons, lights, LEDs), which may be directly accessible via, or attached to, servers 105 or may be indirectly accessible via or attached to the user device 115. According to one aspect, an administrator or operator may access the servers 105 via the user device 115 to review information, make changes, input training data, initiate training via the MLTM 142, and/or perform other functions (e.g., operation of one or more trained models via the MLOM 144).

In one aspect, the computing modules 130 may include one or more NLP modules 148 comprising a set of computer-executable instructions implementing NLP, natural language understanding (NLU) and/or natural language generator (NLG) functionality. The NLP module 148 may be responsible for transforming the user input (e.g., unstructured conversational input such as speech or text) to an interpretable format. The NLP module 148 may include NLU processing to understand the intended meaning of utterances, among other things. The NLP module 148 may include NLG which may provide text summarization, machine translation, and/or dialog where structured data is transformed into natural conversational language (i.e., unstructured) for output to the user.

In one aspect, the computing modules 130 may include one or more chatbots and/or voice bots 150 which may be programmed to simulate human conversation, interact with users, understand their needs, and recommend an appropriate line of action with minimal and/or no human intervention, among other things. This may include providing the best response of any query that it receives and/or asking follow-up questions.

In some embodiments, the voice bots or chatbots 150 discussed herein may be configured to utilize AI and/or ML techniques, such as ML chatbot 152. For instance, the ML chatbot 152 may be a ChatGPT chatbot. The voice bot or chatbot 150 may employ supervised or unsupervised ML techniques, which may be followed by, and/or used in conjunction with, reinforced or reinforcement learning techniques. The voice bot or chatbot 150 may employ the techniques utilized for ChatGPT.

Noted above, in some embodiments, a chatbot 150 or other computing device may be configured to implement ML, such that server 105 "learns" to analyze, organize, and/or process data without being explicitly programmed. ML may be implemented through ML methods and algorithms ("ML methods and algorithms"). In one exemplary embodiment, the ML module 140 may be configured to implement ML methods and algorithms.

As illustrated in FIG. 1, the environment 100 may include one or more devices 160A-N. In one embodiment, the devices 160A-N may be placed proximate a structure such as home 102. The devices 160A-N may be disposed on, inside, or proximate to the structure and/or property. Some examples of "devices" are, without limitation, smoke detectors, carbon monoxide detectors, water heaters, refrigerators, ovens, microwaves, washers, dryers, furnaces, air conditioning units, space heaters, and/or any other device as is known in the art.

The one or more devices 160A-N may be unconnected or may be hard-wired, wirelessly, and/or otherwise connected or interconnected in any suitable manner with one another and/or with one or more servers 105, user devices 115, each or any of which may be equipped with processor(s), memory unit(s), software application(s), wireless transceiver(s), a local power supply, and/or various other components.

The one or more devices 160A-N may sense, operate, or otherwise receive input and/or data in any suitable manner. This may include operating in a continuous and/or intermittent (e.g., every 5 millisecond) fashion. This may also include collecting, storing and/or transmitting data, e.g., via network 110. The data may be stored permanently or non-permanently in any suitable manner, such as on a local storage means, (e.g., RAM or a hard drive), or remotely on the server 105, in the cloud and/or another remote storage means. The one or more devices 160A-N may collect, store and/or transmit data individually or collectively.

The one or more devices 160A-N may communicate with one another in a wired, wireless or any other suitable manner. The communication may be continuous, intermittent, unidirectional, bidirectional or any other suitable means of communication. The one or more devices 160A-N may act in concert, e.g., in creating a mesh network. The one or more devices 160A-N may communicate or otherwise interface with one or more local or remote servers 105, user devices 115, processors, transceivers, each other, and/or other sensors for various purposes which may be unrelated to determining the presence of a safety and/or security issue, such as for timing, scheduling, updates, error correction, troubleshooting, status reporting, or any other suitable purpose.

The one or more servers 105 and/or devices 160A-N may also be in communication with one or more user devices 115, e.g., a user device associated with an owner of the home 102 and/or a service provider. The user device 115 may comprises one or more computers, which may comprise multiple, redundant, or replicated client computers accessed by one or more users. The user device 115 may access services or other components of the computing environment 100 via the network 110. The user device 115 may be any suitable device and include one or more mobile devices, wearables, smart watches, smart contact lenses, smart glasses, AR glasses/headsets, virtual reality (VR) glasses/headsets, mixed or extended reality glasses/headsets, voice bots or chatbots, ChatGPT bots, displays, display screens, visuals, and/or other electronic or electrical component. The user device 115 may include a memory and a processor for, respectively, storing and executing one or more modules. The memory may include one or more suitable storage media such as a magnetic storage device, a solid-state drive, random access memory (RAM), etc. The user device 115 may access services or other components of the computing environment 100 via the network 110, as further described herein.

In some embodiments, when the one or more devices 160A-N determine the presence of a safety and/or security issue, the one or more devices 160A-N may notify a property owner (e.g., via network 110 and/or server 105) of the issue. The property owner notification may include an indication of the location of the issue within the home 102 and/or any other information gathered, determined or which may otherwise be helpful or informative for the property owner.

Although the computing environment 100 is shown to include two user devices 115, one server 105, and one network 110, and four devices 160A-N, it should be understood that different numbers of user devices 115, networks 110, servers 105, and/or devices 160A-N may be utilized. In one example, the computing environment 100 may include a plurality of servers 105 and hundreds or thousands of user devices 115 and/or devices 160A-N, all of which may be interconnected via the network 110.

The computing environment 100 may include additional, fewer, and/or alternate components, and may be configured to perform additional, fewer, or alternate actions, including components/actions described herein. Although the computing environment 100 is shown in FIG. 1 as including one instance of various components such as user device 115, server 105, network 110, devices 160A-N, etc., various aspects include the computing environment 100 implementing any suitable number of any of the components shown in FIG. 1 and/or omitting any suitable ones of the components shown in FIG. 1. For instance, information described as being stored at server database 126 may be stored at memory 122, and thus database 126 may be omitted. Moreover, various aspects include the computing environment 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 105 and user device 115 may be connected via a direct communication link (not shown in FIG. 1) instead of, or in addition to, via network 110.

Exemplary Mobile Device

Figure 2:
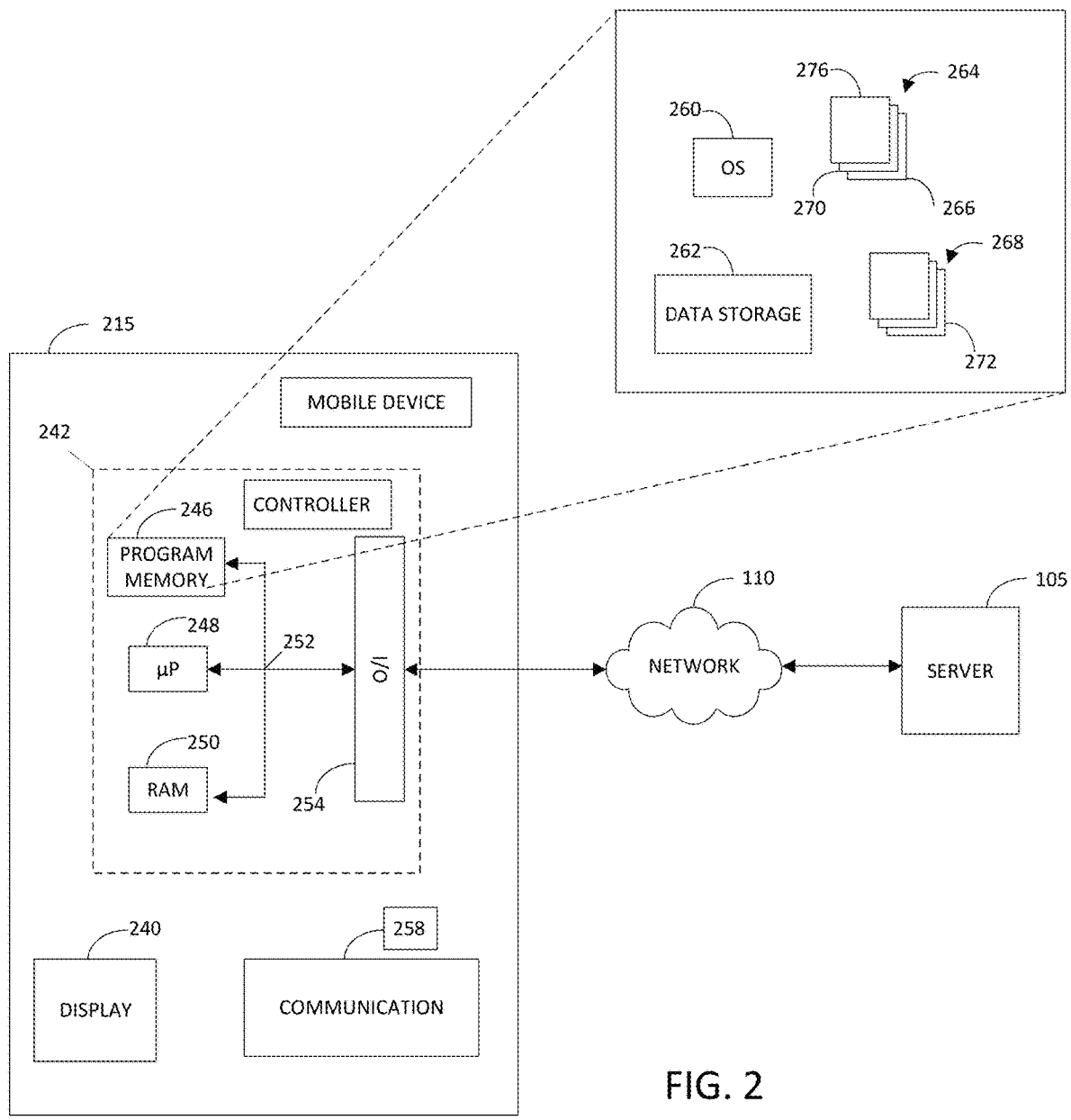
FIG. 2 depicts a block diagram of an exemplary mobile device in which computer-implemented methods and systems for recommended updates to devices proximate a structure are implemented, according to one embodiment.

Referring now to FIG. 2, in one embodiment the user device 115 may include a mobile device 215. The mobile device 215 may include a display 240, a communication unit 258, a user-input device (not shown), and a controller 242. The controller 242 may include a program memory 246, a microcontroller/processor/microprocessor (μP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the one or more servers 105 through the network 110. In some embodiments, the controller 242 may also include, or otherwise be communicatively connected to, other data storage mechanisms (e.g., one or more hard disk drives, optical storage drives, solid state storage devices, etc.) that reside within the mobile device 215.

The communication unit 258 may communicate with the one or more servers 105 via any suitable wireless communication protocol network, such as a wireless telephony network (e.g., GSM, CDMA, LTE, 5G, 6G, UWB etc.), a Wi-Fi network (802.11 standards), a WiMAX network, a Bluetooth network, etc. The user-input device (not shown) may include a "soft" keyboard that is displayed on the display 240 of the mobile device 215, an external hardware keyboard communicating via a wired and/or a wireless connection (e.g., a Bluetooth keyboard), an external mouse, a touchscreen, a stylus, and/or any other suitable user-input device.

As discussed with reference to the one or more servers 105, it should be appreciated that although FIG. 2 depicts only one microprocessor 248, the controller 242 may include multiple microprocessors 248. Similarly, the memory of the controller 242 may include multiple RAMs 250 and/or multiple program memories 246. Although FIG. 2 depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 215.

One of the plurality of applications 264 may be a native application and/or web browser 270, such as Apple's Safari®, Google Chrome™ mobile web browser, Microsoft Internet Explorer® for Mobile, Opera Mobile™, that may be implemented as a series of machine-readable instructions for receiving, interpreting, and/or displaying application screens or web page information from the one or more servers 105 while also receiving inputs from the user. Another application of the plurality of applications may include an embedded web browser 276 that may be implemented as a series of machine-readable instructions for receiving, interpreting, and/or displaying web page information.

In one aspect, a user may launch a client application 266 from a client device, such as one of the user devices 115, to communicate with the one or more servers 105 to determine the optimal placement location of one or more water sensors 160 proximate a structure (such as the home 102). Additionally, the property owner and/or the user may also launch or instantiate any other suitable user interface application (e.g., the native application or web browser 270, and/or any other one of the plurality of software applications 264) to access the one or more servers 105 to realize aspects of the inventive system.

Generally, the term "user" is used when referring to a person who is operating one of the user devices 115 and is not exclusive of the term "property owner," "homeowner," and/or "service provider."

The mobile device 215 may include additional, fewer, and/or alternate components, and may be configured to perform additional, fewer, or alternate actions, including components/actions described herein. Although the mobile device 215 is shown in FIG. 2 as including one instance of various components such as display 240, processor 248, etc., various aspects include the mobile device 215 implementing any suitable number of any of the components shown in FIG. 2 and/or omitting any suitable ones of the components shown in FIG. 2. Moreover, various aspects include the mobile device 215 including any suitable additional component(s) not shown in FIG. 2, such as but not limited to the exemplary components described above. Furthermore, it should be appreciated that additional and/or alternative connections between components shown in FIG. 2 may be implemented.

Exemplary Augmented Reality Device

Figure 3:
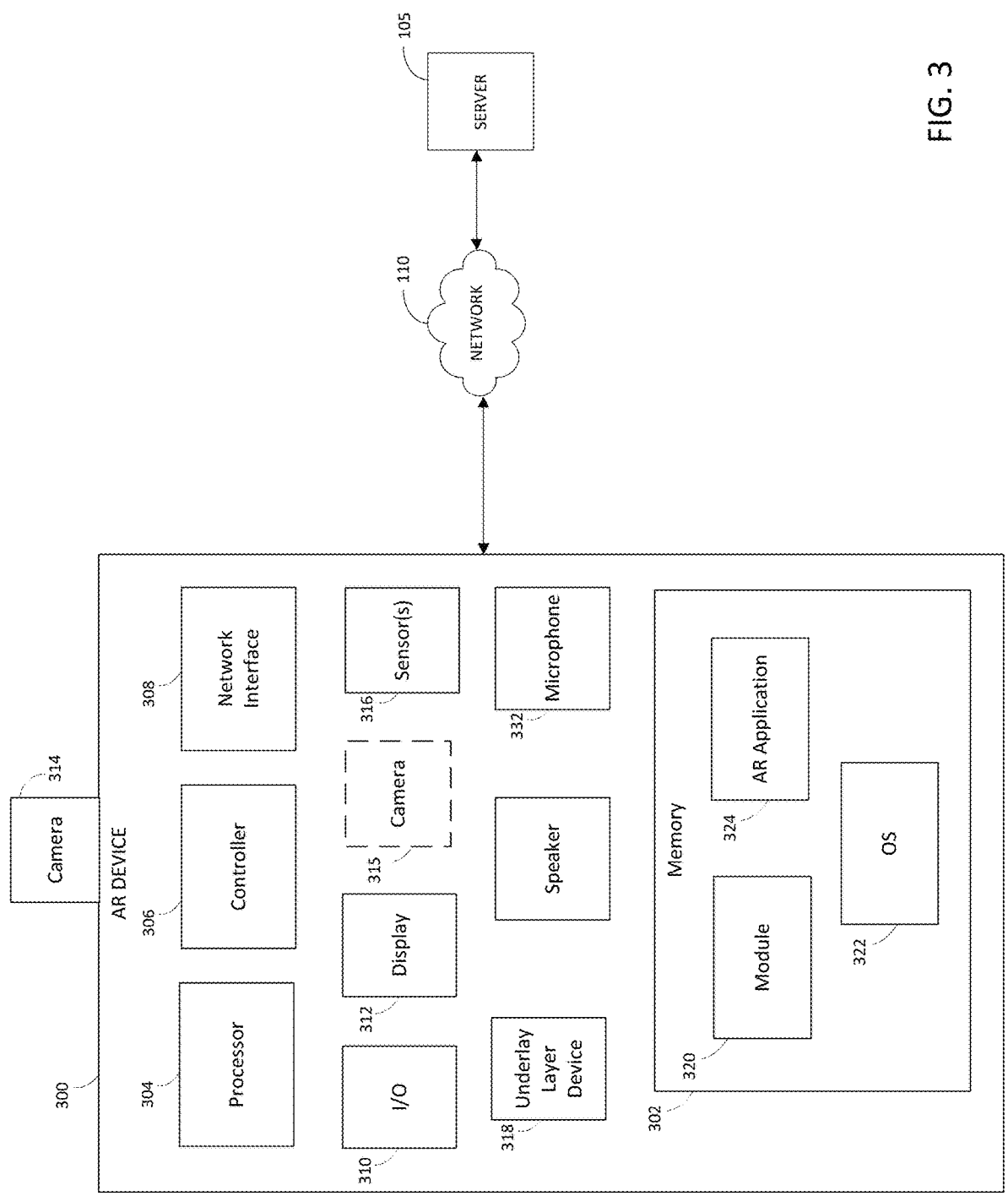
FIG. 3 depicts a block diagram of an exemplary AR device in which computer-implemented methods and systems for recommended updates to devices proximate a structure are implemented, according to one embodiment.

FIG. 3 depicts an exemplary AR viewer device 300 that may implement the techniques described herein, for visualizing device recommendations and/or placement. The AR viewer device 300 may be, for example, a smartphone, tablet device, laptop computer, electronic contact lenses, a projector, glasses, googles, a headset such as the Google Glass or Apple Vision Pro, an MR headset such as the Microsoft HoloLens, and/or another suitable computer device.

The AR viewer device 300 may include a memory 302, a processor (CPU) 304, a controller 306, a network interface 308, an I/O 310, a display 312, cameras 314, 315, sensors 316, an underlay layer device 318, a speaker 330 and/or a microphone 332.

The memory 302 may include one or more memories, such as a non-transitory, computer readable memory comprising computer-executable instructions that, when executed, cause the AR viewer device 300 to perform actions thereof described in this description (e.g., via the processor 304, controller 306, display 312 and/or other components of the AR viewer device 300). The memory 302 may comprise one or more memory modules 320 such a random-access memory (RAM), read-only memory (ROM), flash memory, a hard disk drive (HDD), a solid-state drive (SSD), flash memory, MicroSD cards, and/or other types of suitable memory.

The memory 302 may store an operating system (OS) 322 (e.g., Microsoft Windows Mixed Reality Platform, Linux, Android, iOS, UNIX, etc.) capable of facilitating the functionalities, applications, methods, or other software as discussed herein. Memory 302 may also store one or more applications to, e.g., for receiving recommendations for placing new devices proximate a structure such as a home. In one embodiment, memory 302 may store an AR application 324 which may, among other things, present AR displays to the display 312 of AR viewer device 300 as described in more detail herein.

Additionally, or alternatively, the memory 302 may store data from various sources, e.g., AR displays, virtual models, overlay layer data, floorplans, structure information, property information, existing devices, as well as any other suitable data.

The processor 304 may include one or more local or remote processors, which may be of general-purpose or specific-purpose. In some embodiments this may include one or more microprocessors, ASICs, FPGAs, systems-on-chip (SoCs), systems-in-package (SiPs), graphics processing units (GPUs), well as any other suitable types of processors. During operation, the processor 304 may execute instructions stored in the program memory module 302 coupled to the processor 304 via a system bus of a controller 306.

The AR viewer device 300 may further include the controller 306. The controller 306 may receive, process, generate, transmit, and/or store data and may include and/or be operably connected to (e.g., via the system bus) the memory 302, the processor 304, and/or the I/O 310, as well as any other suitable components.

The AR viewer device 300 may further include a network interface 308, which may facilitate communications to and/or from the AR viewer device 300 with one or more devices and/or networks, such as the server 105 via network 110. The network interface 308 may include one or more transceivers and/or modems, and may facilitate any suitable wired or wireless communication, standard or technology, such as GSM, CDMA, TDMA, WCDMA, LTE, EDGE, OFDM, GPRS, EV-DO, UWB, 3G, 4G, 5G, 6G, IEEE 802 including Ethernet, WiMAX, Wi-Fi, Bluetooth, and/or other suitable communication.

The I/O 310 (i.e., one or more input and/or output units) may include, interface with and/or be operably connected to, for example, one or more input devices such as a touchpad, a touchscreen, a keyboard, a mouse, a camera 314, 315, underlay layer device 318, and/or microphone 332, as well as one or more output devices such as a display 312, a speaker 330, a haptic/vibration device, and/or other suitable input and/or output devices. In some embodiments, the I/O 310 may include one or more peripheral I/O devices, such as a peripheral display, microphone 332, camera 314, 315, sensors 316 and/or other interface devices operably connected to the AR viewer device 300 (e.g., via a wired or wireless connection) via the I/O 310. Although FIG. 3 depicts the I/O 310 as a single block, the I/O 310 may include a number of different I/O circuits, busses and/or modules, which may be configured for I/O operations.

One or more cameras 314, 315 may capture still and/or video images of the physical environment of the AR viewer device 300. The cameras 314, 315 may include digital cameras, such as charge-coupled devices, to detect electromagnetic radiation in the visual range or other wavelengths. In some embodiments, as depicted in FIG. 3, one or more interior cameras 315 may be located on the interior of the AR viewer device 300, e.g., for tracking the eyes of the user via OS 322 and/or AR application 324. The AR viewer device 300 may include one or more exterior cameras 314 located on the exterior of AR viewer device 300, e.g., for user hand tracking, object identification, and/or localization within the physical environment via OS 322 and/or AR application 324. In other embodiments, one or more of the cameras (not shown) may be external to, and operably connected with (e.g., via I/O 310, Bluetooth and/or Wi-Fi) the AR viewer device 300. The captured images may be used to generate AR displays, augmented environments, and the like. In some embodiments, two or more cameras, such as external cameras 314, may be disposed to obtain stereoscopic images of the physical environment, thereby better enabling the AR viewer device 300 to generate virtual space representations of the physical environment, and/or overlay augmented information onto the physical environment.

The display 312, along with other integrated or operably connected devices, may present augmented and/or virtual information to a user of the AR viewer device 300, such as an AR display. The display 312 may include any known or hereafter developed visual or tactile display technology, including LCD, LED, OLED, AMOLED, a projection display, a haptic display, a holographic display, or other types of displays. In some embodiments, the display 312 may include dual and/or stereoscopic displays, e.g., one for presenting content to the left eye and another for presenting content to the right eye. In some embodiments, the display 312 may be transparent allowing the user to see the physical environment around them, e.g., for implementing AR techniques in which an AR display may be overlaid on the physical environment.

According to one embodiment of FIG. 3, the AR viewer device 300 may present one or more AR displays via the display 312. For example, the display 312 may be a surface positioned in a line of sight of the wearer of the AR viewer device 300. Accordingly, the AR viewer device 300 may be configured to overlay augmented information included in the AR display onto features of the physical environment within the line of sight of the wearer of the AR viewer device 300. To determine the line of sight of the wearer, the AR viewer device 300 may include an image sensor (such as an external camera 314 and/or underlay layer device 318) configured to have a field of view that generally aligns with the line of the sight of the wearer. In one embodiment, the AR viewer device 300 may be configured to route the image data to the server 105 to generate an AR display that includes information related to objects within the line of sight of the wearer. For example, the server 105 may include one or more object classification models configured to identify one or more objects within the received image data and provide the classification data back to the AR viewer device to present an AR display that includes at least a portion of the classification data.

The AR viewer device 300 may further include one or more sensors 316. In some embodiments, additional local and/or remote sensors 316 may be communicatively connected to the AR viewer device 300. The sensors 316 may include any devices or components mentioned herein, other devices suitable for capturing data regarding the physical environment, and/or later-developed devices that may be configured to provide data regarding the physical environment (including components of structures or objects within the physical environment).

Exemplary sensors 316 of the AR viewer device 300 may include one or more accelerometers, gyroscopes, inertial measurement units (IMUs), GPS units, proximity sensors, cameras 314, 315 microphones 332, as well as any other suitable sensors. Additionally, other types of currently available or later-developed sensors may be included in some embodiments. One or more sensors 316 of the AR viewer device 300 may be configured for localization, eye/hand/head/movement tracking, geolocation, object recognition, computer vision, photography, positioning and/or spatial orientation of the device, as well as other suitable purposes. The sensors 316 may provide sensor data regarding the local physical environment which may be used to generate a corresponding AR display, as described herein, among other things.

AR viewer device 300 may further include underlay layer device 318 configured to generate underlay layer data from the field of view of the wearer. As will be described elsewhere herein, the underlay layer data may be analyzed to create the AR display. In one illustrative example, the underlay layer device 318 may be a camera, such as camera 314, coupled to the AR viewer device 300 in a manner such that the camera has a field of view that generally aligns with the field of view of a user of the AR viewer device 300. As used herein, the word "camera" should be understood to include a camera that records one or both of images and/or video data. In certain embodiments where the AR viewer device 300 is a phone or a tablet, the underlay layer data device 318 may be built into the AR viewer device 300. In some embodiments where the AR viewer device 300 is worn by the user, the underlay layer data device 318 may be fixedly attached to the AR viewer device 300.

In one embodiment, the AR viewer device 300 or other device may process data from one or more sensors 316 to generate a semi-virtual environment. For example, data from one or more sensors 316, such as cameras 314, 315, underlay layer device 318, accelerometers, gyroscopes, IMUs, etc., may be processed, e.g., at the server 105 and/or at the AR viewer device 300, which may include AR application 324, to determine aspects of the physical environment which may include object recognition, the orientation and/or localization of the AR viewer device 300, the field of view of the user, among other things. In one embodiment, the sensor data may be combined with image data generated by the cameras 314, 315 and/or underlay layer device 318 to present AR displays via the display 312 of the AR viewer device 300 using the AR application 324, which may include displaying and/or overlaying images, models, instructions, animations, video, multimedia and/or other digitally-generated content onto the physical environment via the display 312.

The AR viewer device 300 may include one or more speakers 330 configured to emit sounds and one or more microphones 332 configured to detect sounds. The one or more speakers 330 and/or microphones 332 may be disposed on the AR viewer device 300 and/or remotely from, and operably connected to, the AR viewer device 300, e.g., via a wire and/or wirelessly. In one embodiment, the speaker 330 and/or microphone 332 may be configured to provide multimedia effects in conjunction with an AR display, receive voice commands e.g., to control the AR viewer device 300, among other things.

In one embodiment, AR viewer device 300 may receive and/or access overlay layer data (e.g., data stored in a database, such as database 126) to create the AR display. For example, the database 126 on server 105 may be configured to store existing device information associated with a structure. The existing device information may include an identification, location, and/or update history of devices associated with the structure, among other things. The overlay layer data may be correlated (e.g., on the server 105) with the underlay layer data (e.g., from the underlay layer device 318) to create the AR display. For example, a user of the AR viewer device 300 may have access to existing device information for their present location, including a floorplan.

The AR viewer device 300 and/or server 105 may process the underlay layer data generated via underlay layer data device 318, data from sensors 316 such as locations via a GPS sensor, orientation data from an orientation sensor and/or overlay layer data of the floorplan. The AR viewer device 300 and/or server 105 may correlate the overlay layer data, underlay layer data and/or sensor data to generate an AR display, identify the location of the AR viewer device 300, and/or any other suitable purpose. The AR display may identify the room of the structure the user is in, objects in the field of view of the user (e.g., existing devices), guidance information to travel to other locations, information regarding safety and/or security issues proximate the user, recommendations of updates to devices, improvements to a home score upon completion of the recommended updates, or other suitable information.

In some embodiments, the AR viewer device 300 may be a personal electronic device, such as a smartphone or tablet. For example, the personal electronic device may be configured to execute the AR application 324 in which a rear-facing camera captures image data of the physical environment proximate to the AR viewer device 300 and overlays AR data onto the display 312. Accordingly, in these embodiments, the functionality of the AR viewer device 300 and/or the personal electronic device may be integrated at a single device.

In other embodiments, the AR viewer device 300 may include a base unit coupled to an AR viewer. For example, the base unit may be integrally formed with the AR viewer, such as in a frame that supports the display 312.

In other embodiments, the base unit and the AR viewer are physically separate and in wireless communication (e.g., via Bluetooth, Wi-Fi, or other short-range communication protocol) or wired communication with one another. In these embodiments, both the base unit and the AR viewer may include local versions of the components described with respect to the AR viewer device 300. For example, both the base unit and the AR viewer may include respective memories 302, processors 304, controllers 306, network interfaces 308, and/or sensors 316. Accordingly, the respective memories 302 may include respective versions of the AR application 324 that coordinate the execution of the functionality described herein between the AR viewer and the base unit.

Generally, the AR application 324 may utilize the components of the base unit to perform the more processor-intensive functionality described with respect to the AR viewer device 300. For example, the base unit may be configured to process sensor data, wirelessly communicate with the server 105, create AR displays, etc. On the other hand, the AR application 324 may utilize the components of the viewer device to transmit sensor data to present AR displays via the display 312.

The AR viewer device 300 may include a power source (not shown), such as a rechargeable battery pack. The power source may be integral to the AR viewer device 300 and/or may be a separate power source within the base unit and operably connected to the AR viewer device 300.

The AR viewer device 300 may include additional, fewer, and/or alternate components, and may be configured to perform additional, fewer, or alternate actions, including components/actions described herein. Although the AR viewer device 300 is shown in FIG. 3 as including one instance of various components such as processor 304, underlay layer device 318 etc., various aspects include the AR viewer device 300 implementing any suitable number of any of the components shown in FIG. 3 and/or omitting any suitable ones of the components shown in FIG. 3. Moreover, various aspects include the AR viewer device 300 including any suitable additional component(s) not shown in FIG. 3, such as but not limited to the exemplary components described above. Furthermore, it should be appreciated that additional and/or alternative connections between components shown in FIG. 3 may be implemented.

Exemplary Training of the ML Chatbot Model

Programmable chatbots, such as the chatbot 150 and/or the ML chatbot 152 (e.g., ChatGPT), may provide tailored, conversational-like abilities relevant to recommending placement of new devices proximate a structure. The chatbot may be capable of understanding user requests/responses, providing relevant information, etc. Additionally, the chatbot may generate data from user interactions which the enterprise may use to personalize future support and/or improve the chatbot's functionality, e.g., when retraining and/or fine-tuning the chatbot.

The ML chatbot may provide advanced features as compared to a non-ML chatbot, which may include and/or derive functionality from a large language model (LLM). The ML chatbot may be trained on a server, such as server 105, using large training datasets of text which may provide sophisticated capability for natural-language tasks, such as answering questions and/or holding conversations. The ML chatbot may include a general-purpose pretrained LLM which, when provided with a starting set of words (prompt) as an input, may attempt to provide an output (response) of the most likely set of words that follow from the input. In one aspect, the prompt may be provided to, and/or the response received from, the ML chatbot and/or any other ML model, via a user interface of the server. This may include a user interface device operably connected to the server via an I/O module, such as the I/O module 146. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances and/or prompts, which may require the ML chatbot to keep track of an entire conversation history as well as the current state of the conversation. The ML chatbot may rely on various techniques to engage in conversations with users, which may include the use of short-term and long-term memory. Short-term memory may temporarily store information (e.g., in the memory 122 of the server 105) that may be required for immediate use and may keep track of the current state of the conversation and/or to understand the user's latest input in order to generate an appropriate response. Long-term memory may include persistent storage of information (e.g., on database 126 of the server 105) which may be accessed over an extended period of time. The long-term memory may be used by the ML chatbot to store information about the user (e.g., preferences, chat history, etc.) and may be useful for improving an overall user experience by enabling the ML chatbot to personalize and/or provide more informed responses.

The system and methods to generate and/or train an ML chatbot model (e.g., via the ML module 140 of the server 105) which may be used by the ML chatbot, may consist of three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 4:
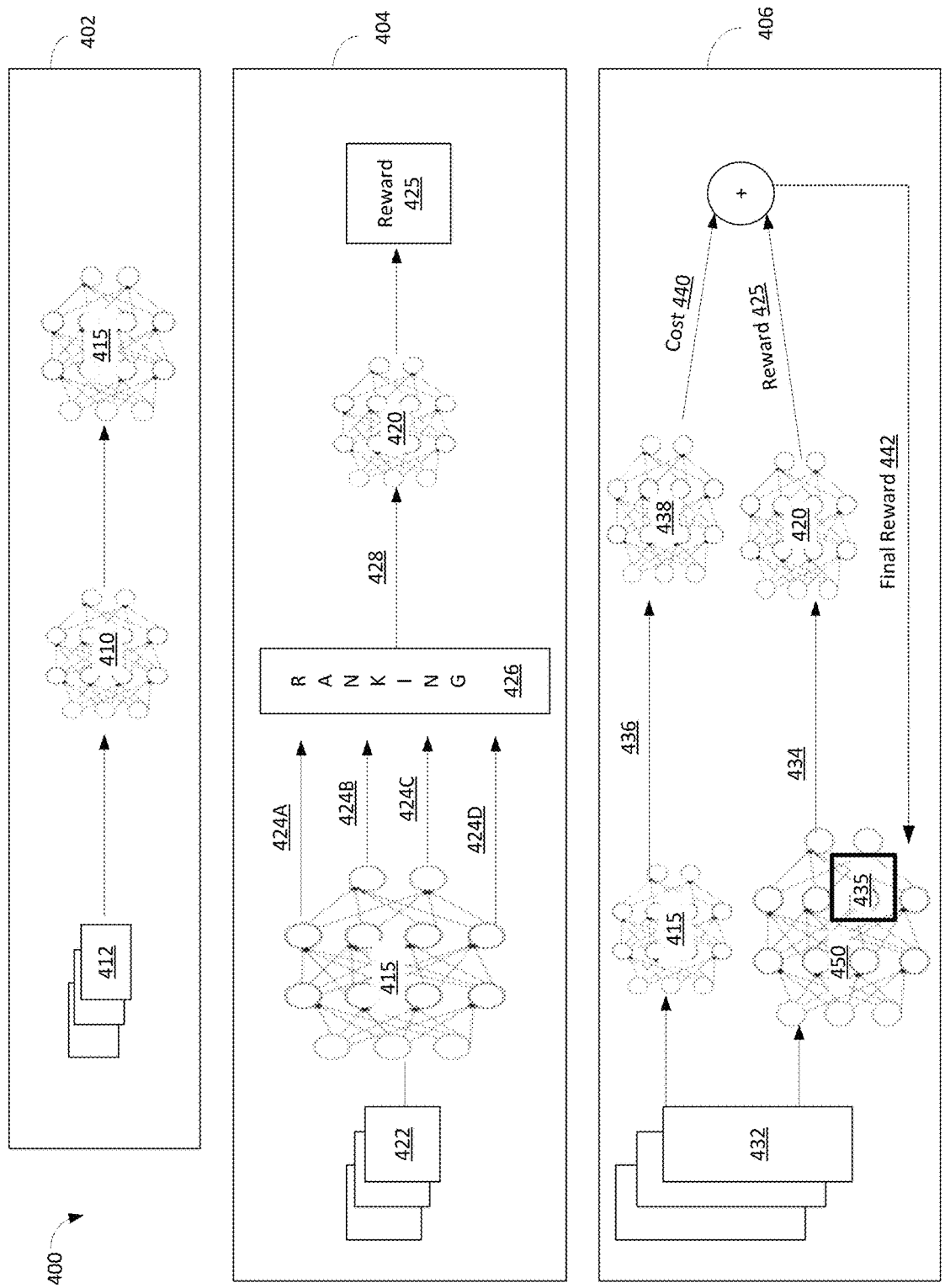
FIG. 4 depicts a combined block and logic diagram in which exemplary computer-implemented methods and systems for training an ML chatbot model are implemented, according to one embodiment.

FIG. 4 depicts a combined block and logic diagram 400 for training an ML chatbot model, in which the techniques described herein may be implemented, according to some embodiments. Some of the blocks in FIG. 4 may represent hardware and/or software components, other blocks may represent data structures or memory storing these data structures, registers, or state variables (e.g., data structures for training data 412), and other blocks may represent output data (e.g., 425). Input and/or output signals may be represented by arrows labeled with corresponding signal names and/or other identifiers. The methods and systems may include one or more servers 402, 404, 406, such as the server 105 of FIG. 1.

In one aspect, the server 402 may fine-tune a pretrained language model 410. The pretrained language model 410 may be obtained by the server 402 and be stored in a memory, such as memory 122 and/or database 126. The pretrained language model 410 may be loaded into an ML training module, such as MLTL 142, by the server 402 for retraining/fine-tuning. A supervised training dataset 412 may be used to fine-tune the pretrained language model 410 wherein each data input prompt to the pretrained language model 410 may have a known output response for the pretrained language model 410 to learn from. The supervised training dataset 412 may be stored in a memory of the server 402, e.g., the memory 122 or the database 126. In one aspect, the data labelers may create the supervised training dataset 412 prompts and appropriate responses. The pretrained language model 410 may be fine-tuned using the supervised training dataset 412 resulting in the SFT ML model 415 which may provide appropriate responses to user prompts once trained. The trained SFT ML model 415 may be stored in a memory of the server 402, e.g., memory 122 and/or database 126.

In one aspect, the supervised training dataset 412 may include prompts and responses which may be relevant to determining recommended devices proximate a structure. For example, a user prompt may include a request of what new devices placed around a home would improve a home score. Appropriate responses from the trained SFT ML model 415 may include requesting from the user information regarding the floorplan, structural components, the property the structure is located upon, existing devices at the structure, or other information associated with determining recommended devices. The responses from the trained SFT ML model 415 may include an indication of one or more optimal placement locations of the one or more recommended devices. The responses from the trained SFT ML model 415 may include an indication of a home score improvement based upon placement of the one or more recommended devices proximate the home. The indications may be via text, audio, multimedia, etc.

Training the Reward Model

In one aspect, training the ML chatbot model 450 may include the server 404 training a reward model 420 to provide as an output a scaler value/reward 425. The reward model 420 may be required to leverage reinforcement learning with human feedback (RLHF) in which a model (e.g., ML chatbot model 450) learns to produce outputs which maximize its reward 425, and in doing so may provide responses which are better aligned to user prompts.

Training the reward model 420 may include the server 404 providing a single prompt 422 to the SFT ML model 415 as an input. The input prompt 422 may be provided via an input device (e.g., a keyboard) via the I/O module of the server, such as I/O module 146. The prompt 422 may be previously unknown to the SFT ML model 415, e.g., the labelers may generate new prompt data, the prompt 422 may include testing data stored on database 126, and/or any other suitable prompt data. The SFT ML model 415 may generate multiple, different output responses 424A, 424B, 424C, 424D to the single prompt 422. The server 404 may output the responses 424A, 424B, 424C, 424D via an I/O module (e.g., I/O module 146) to a user interface device, such as a display (e.g., as text responses), a speaker (e.g., as audio/voice responses), and/or any other suitable manner of output of the responses 424A, 424B, 424C, 424D for review by the data labelers.

The data labelers may provide feedback via the server 404 on the responses 424A, 424B, 424C, 424D when ranking 426 them from best to worst based upon the prompt-response pairs. The data labelers may rank 426 the responses 424A, 424B, 424C, 424D by labeling the associated data. The ranked prompt-response pairs 228 may be used to train the reward model 420. In one aspect, the server 404 may load the reward model 420 via the ML module (e.g., the ML module 140) and train the reward model 420 using the ranked response pairs 228 as input. The reward model 420 may provide as an output the scalar reward 425.

In one aspect, the scalar reward 425 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 420 may generate a winning reward. Inputting a "losing" prompt-response pair data to the same reward model 420 may generate a losing reward. The reward model 420 and/or scalar reward 436 may be updated based upon labelers ranking 426 additional prompt-response pairs generated in response to additional prompts 422.

In one example, a data labeler may provide to the SFT ML model 415 as an input prompt 422, "Describe the sky." The input may be provided by the labeler via the user device 102 over network 110 to the server 404 running a chatbot application utilizing the SFT ML model 415. The SFT ML model 415 may provide as output responses to the labeler via the user device 102: (i) "the sky is above" 424A; (ii) "the sky includes the atmosphere and may be considered a place between the ground and outer space" 424B; and (iii) "the sky is heavenly" 424C. The data labeler may rank 426, via labeling the prompt-response pairs, prompt-response pair 422/424B as the most preferred answer; prompt-response pair 422/424A as a less preferred answer; and prompt-response 422/424C as the least preferred answer. The labeler may rank 426 the prompt-response pair data in any suitable manner. The ranked prompt-response pairs 228 may be provided to the reward model 420 to generate the scalar reward 425.

While the reward model 420 may provide the scalar reward 425 as an output, the reward model 420 may not generate a response (e.g., text). Rather, the scalar reward 425 may be used by a version of the SFT ML model 415 to generate more accurate responses to prompts, i.e., the SFT model 415 may generate the response such as text to the prompt, and the reward model 420 may receive the response to generate a scalar reward 425 of how well humans perceive it. Reinforcement learning may optimize the SFT model 415 with respect to the reward model 420 which may realize the configured ML chatbot model 450.

RLHF to Train the ML Chatbot Model

In one aspect, the server 406 may train the ML chatbot model 450 (e.g., via the ML module 140) to generate a response 434 to a random, new and/or previously unknown user prompt 432. To generate the response 434, the ML chatbot model 450 may use a policy 235 (e.g., algorithm) which it learns during training of the reward model 420, and in doing so may advance from the SFT model 415 to the ML chatbot model 450. The policy 235 may represent a strategy that the ML chatbot model 450 learns to maximize its reward 425. As discussed herein, based upon prompt-response pairs, a human labeler may continuously provide feedback to assist in determining how well the ML chatbot's 450 responses match expected responses to determine rewards 425. The rewards 425 may feed back into the ML chatbot model 450 to evolve the policy 235. Thus, the policy 235 may adjust the parameters of the ML chatbot model 450 based upon the rewards 425 it receives for generating good responses. The policy 235 may update as the ML chatbot model 450 provides responses 434 to additional prompts 432.

In one aspect, the response 434 of the ML chatbot model 450 using the policy 235 based upon the reward 425 may be compared using a cost function 438 to the SFT ML model 415 (which may not use a policy) response 436 of the same prompt 432. The server 406 may compute a cost 440 based upon the cost function 438 of the responses 434, 436. The cost 440 may reduce the distance between the responses 434, 436, i.e., a statistical distance measuring how one probability distribution is different from a second, in one aspect the response 434 of the ML chatbot model 450 versus the response 436 of the SFT model 415. Using the cost 440 to reduce the distance between the responses 434, 436 may avoid a server over-optimizing the reward model 420 and deviating too drastically from the human-intended/preferred response. Without the cost 440, the ML chatbot model 450 optimizations may result in generating responses 434 which are unreasonable but may still result in the reward model 420 outputting a high reward 425.

In one aspect, the responses 434 of the ML chatbot model 450 using the current policy 235 may be passed by the server 406 to the rewards model 420, which may return the scalar reward or discount 425. The ML chatbot model 450 response 434 may be compared via cost function 438 to the SFT ML model 415 response 436 by the server 406 to compute the cost 440. The server 406 may generate a final reward 442 which may include the scalar reward 425 offset and/or restricted by the cost 440. The final reward or discount 442 may be provided by the server 406 to the ML chatbot model 450 and may update the policy 235, which in turn may improve the functionality of the ML chatbot model 450.

To optimize the ML chatbot 450 over time, RLHF via the human labeler feedback may continue ranking 426 responses of the ML chatbot model 450 versus outputs of earlier/other versions of the SFT ML model 415, i.e., providing positive or negative rewards or adjustments 425. The RLHF may allow the servers (e.g., servers 404, 406) to continue iteratively updating the reward model 420 and/or the policy 235. As a result, the ML chatbot model 450 may be retrained and/or fine-tuned based upon the human feedback via the RLHF process, and throughout continuing conversations may become increasingly efficient.

Although multiple servers 402, 404, 406 are depicted in the exemplary block and logic diagram 400, each providing one of the three steps of the overall ML chatbot model 450 training, fewer and/or additional servers may be utilized and/or may provide the one or more steps of the ML chatbot model 450 training. In one aspect, one server may provide the entire ML chatbot model 450 training.

Exemplary ML Model to Determine Recommended Updates to Devices

In one embodiment, determining recommendations for updating one or more devices proximate a structure and calculating a resulting improvement to a home score may use ML. The structure may include a home, business, and/or other structure.

Figure 5:
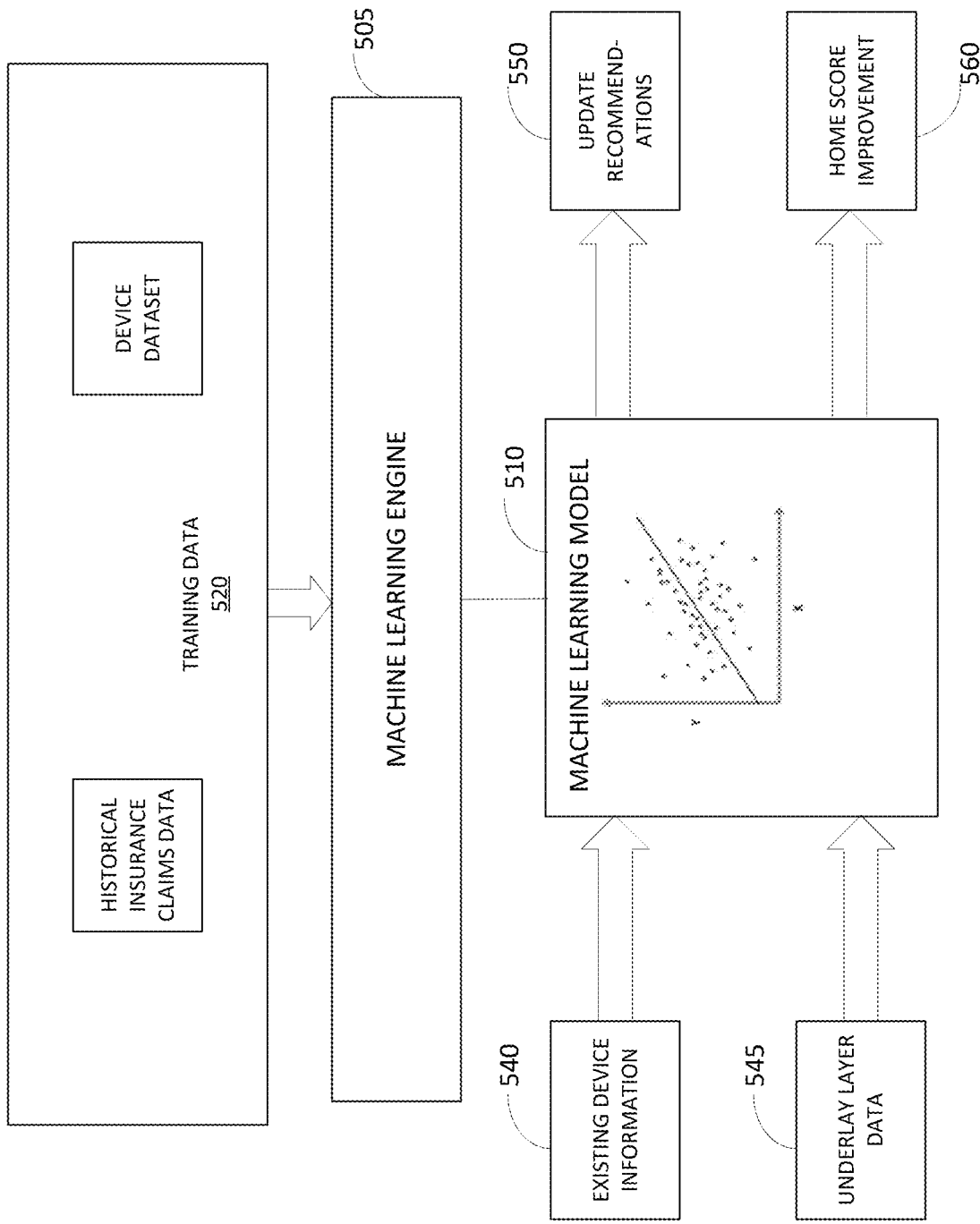
FIG. 5 depicts a combined block and logic diagram in which exemplary computer-implemented methods and systems for using ML to identify existing devices, generate recommended updates to existing devices, and calculate home score improvements are implemented, according to one embodiment.

FIG. 5 schematically illustrates how an ML model may generate device update recommendations and home score improvements based upon structure information. Some of the blocks in FIG. 5 represent hardware and/or software components (e.g., block 505), other blocks represent data structures or memory storing these data structures, registers, or state variables (e.g., blocks 520), and other blocks represent output data (e.g., blocks 550 and 560). Input signals are represented by arrows labeled with corresponding signal names.

The ML engine 505 may include one or more hardware and/or software components, such as the MLTM 142 and/or the MLOM 144, to obtain, create, (re)train, operate and/or save one or more ML models 510. To generate the ML model 510, the ML engine 505 may use the training data 520.

As described herein, the server such as server 105 may obtain and/or have available various types of training data 520 (e.g., stored on database 126 of server 105). In an aspect, the training data 520 may labeled to aid in training, retraining and/or fine-tuning the ML model 510. The training data 520 may include data associated with historical insurance claims which may indicate one or more of a type of loss, amount of loss, devices present or absent in the structure, and/or a type of structure. For example, the historical insurance claims data may indicate that a two-story, 2600 sq. ft home had a ten year old water heater that leaked and caused water damage.

The training data 520 may include a device dataset. The device dataset may comprise classes of devices, specific device models, maintenance schedules and/or activities, recalls, available firmware upgrades, expected lifetimes, etc. The device dataset may include severity scores associated with the updates and/or maintenance. An ML model may process this type of training data 520 to derive associations between losses, existing devices, and recommended updates.

While the example training data includes indications of various types of training data 520, this is merely an example for ease of illustration only. The training data 520 may include any suitable data which may indicate associations between historical claims data, potential sources of loss, actions for mitigating the risk of loss, home score improvements, as well as any other suitable data which may train the ML model 510 to generate a recommendation of one or more device updates and a resulting home score improvement.

In an aspect, the server may continuously update the training data 520, e.g., based upon obtaining additional historical insurance claims data, additional device data, or any other training data. Subsequently, the ML model 510 may be retrained/fine-tuned based upon the updated training data 520. Accordingly, the device update recommendations 550 and resulting home score improvement 560 may improve over time.

In an aspect, the ML engine 505 may process and/or analyze the training data 520 (e.g., via MLTM 142) to train the ML model 510 to generate the device update recommendations 550 and/or home score improvements 560. The ML model 510 may be trained to generate the update recommendations 550 and/or home score improvements 560 via a neural network, deep learning model, Transformer-based model, generative pretrained transformer (GPT), generative adversarial network (GAN), regression model, k-nearest neighbor algorithm, support vector regression algorithm, and/or random forest algorithm, although any type of applicable ML model/algorithm may be used, including training using one or more of supervised learning, unsupervised learning, semi-supervised learning, and/or reinforcement learning.

Once trained, the ML model 510 may perform operations on one or more data inputs to produce a desired data output. In one aspect, the ML model 510 may be loaded at runtime (e.g., by MLOM 144) from a database (e.g., database 126 of server 105) to process the existing devices 540 and/or underlay layer data 545 inputs. The server, such as server 105, may obtain existing devices information 540 and/or underlay layer data 545 and use it as an input to determine update recommendations 550. In one aspect, the server may obtain the existing devices information 540 via user input on a user device, such as the mobile device 215 (e.g., of the property owner) which may be running a mobile app and/or via a website, the chatbot 450, the AR viewer device 300, or any other suitable user device. The server may obtain the existing devices information 540 from available data associated with the structure such as an insurance company which may have insured the structure and gathered relevant existing devices information 540 in the process, customer purchase records, as well as other suitable sources of existing devices information 540.

The existing devices information 540 may include the category, model number, age, features, and/or maintenance history of the devices. The existing devices information 540 may include any information which may be relevant to generating update recommendations 550 and/or home score improvements 560.

In one aspect, the server may obtain the underlay layer data 545 via the AR viewer device 300 or any other suitable user device, such as a camera. The underlay layer data 545 may include images and/or video of the interior, exterior, and/or property proximate the structure. The underlay layer data 545 may comprise images and/or video of existing devices proximate the structure. The ML model 510 may use the underlay layer data 545 to detect the presence of and/or identify existing devices proximate the structure.

In one aspect, the ML model 510 may weigh one or more attributes of the existing devices information 540 and/or underlay layer data 545 such that they are of unequal importance. For example, a microwave that has been recalled by the manufacturer for a fire hazard may be deemed more important than an old water heater. Thus, the ML model 510 may apply an increased weight to the recalled microwave and rank, score, or otherwise indicate the microwave update recommendation more strongly as compared to the water heater update recommendation.

In one embodiment, the ML model 510 may use a regression model to determine a score associated with the update recommendations based upon the existing device information 540 and/or underlay layer data 545 inputs, which may be a preferred model in situations involving scoring output data. In one aspect, the ML model 510 may rank locations of potential loss where a recommended updates should occur. This may include scored ranking such that devices having certain scores may be considered as having the highest potential as a source of a loss and thus be optimal candidates for an update. For example, based upon the existing device information 540 and/or underlay layer data 545, the ML model may indicate replacement of an old water heater is a high priority based upon associated home improvement scores, but upgrading to a smart thermostat may not have as high of a home improvement score.

Once the update recommendations 550 and/or home score improvements 560 are generated by the ML model 510, they may be provided to a user device. For example, the server may provide the update recommendations 550 and resulting home score improvements 560 via a mobile app to mobile device such as mobile device 215, in an email, via a graphical user interface on an AR device (such as the AR viewer device 300), a website, via a chatbot (such as the ML chatbot 450), and/or in any other suitable manner as further described herein.

In one aspect, the owner, renter and/or other party associated with the structure may be entitled to one or more incentives on an insurance policy and/or other products and/or services associated with the structure upon receiving and performing the recommended updates to one or more devices.

Exemplary Dataset of Devices

FIG. 6A depicts an exemplary device dataset 600, according to an embodiment. The device dataset 600 may be stored in database 126, data storage 262, and/or in any other suitable storage location. The exemplary device dataset 600 may comprise information about a plurality of devices currently and/or previously available for sale.

According to the example of FIG. 6A, the device dataset 600 may comprise one or more device categories, such as microwaves and water heaters. Each device category may comprise information about devices currently for sale and/or no longer for sale. In one aspect, each device category may comprise a table that may further comprise a plurality of fields. For example, the microwaves table 610 may comprise brand, model, expected lifespan, maintenance, recalls, firmware upgrades, wattage, importance, and/or any other suitable fields. As a further example, the water heaters table 620 may comprise brand, model, expected lifespan, maintenance, recalls, capacity, power source, importance, and/or any other suitable fields. The importance field may be a score, e.g., 0 to 100, assigned to the devices in the table. The importance field may be manually assigned, obtained from a ratings data source, and/or automatically calculated based upon one or more of the fields. The importance field may be adjusted based upon claims data associated with the devices. The importance field may contribute to an update recommendation and/or home score improvement calculation.

In another aspect, the tables, such as microwaves table 610 and water heaters table 620, may comprise a plurality of records in which each record may correspond to a device. For example, the microwaves table 610 may comprise a plurality of records for microwave devices, including records 612, 614, 616. As another example, the water heaters table may comprise a plurality of records for water heater devices, including records 622, 624.

In one aspect, the device dataset 600 may comprise one or more images of the devices. The one or more images may comprise a plurality of images of a device from different perspectives, e.g., top, bottom, side, etc.

In one aspect, the device dataset 600 may be obtained by a server as described herein, such as server 105, which may be associated with an insurance provider, consumer product rating agency, and/or other entity offering information about devices. Information in the device dataset 600, including one or more fields and/or one or more records, may obtained from one or more public data sources, proprietary data sources, and/or via manual entry. Information in the device dataset 600 may be periodically updated.

In one aspect, the data used to train the machine learning engine 505, such as training data 520, comprises the device dataset 600.

Exemplary Information about Existing Devices

FIG. 6B depicts exemplary existing device information 630, according to an embodiment. The existing device information 630 may be stored in database 126, data storage 262, and/or in any other suitable storage location. The existing device information 630 may comprise information about devices proximate a structure.

According to the example of FIG. 6B, the existing device information 630 may comprise a table that may further comprise a plurality of fields. For example, the existing device information 630 may comprise type, brand, model, age, last maintenance, and/or any other suitable fields.

In another aspect, the existing device information 630 may comprise a plurality of records in which each record may correspond to a device. For example, the existing device information 630 may comprise a plurality of records for existing devices, including records 632, 634.

In one aspect, the existing device information 630 may comprise one or more images of the devices. The one or more images may comprise a plurality of images of a device from different perspectives, e.g., top, bottom, side, etc.

In one aspect, existing device information 630 may be obtained by a user device as described herein, such as user devices 115. Existing device information 630, including one or more fields and/or one or more records, may be obtained automatically and/or via manual entry. Information in the device dataset 600 may be periodically updated.

In one aspect, the input data for the machine learning model, such as existing devices information 540, comprises the existing device information 630.

Figure 7:
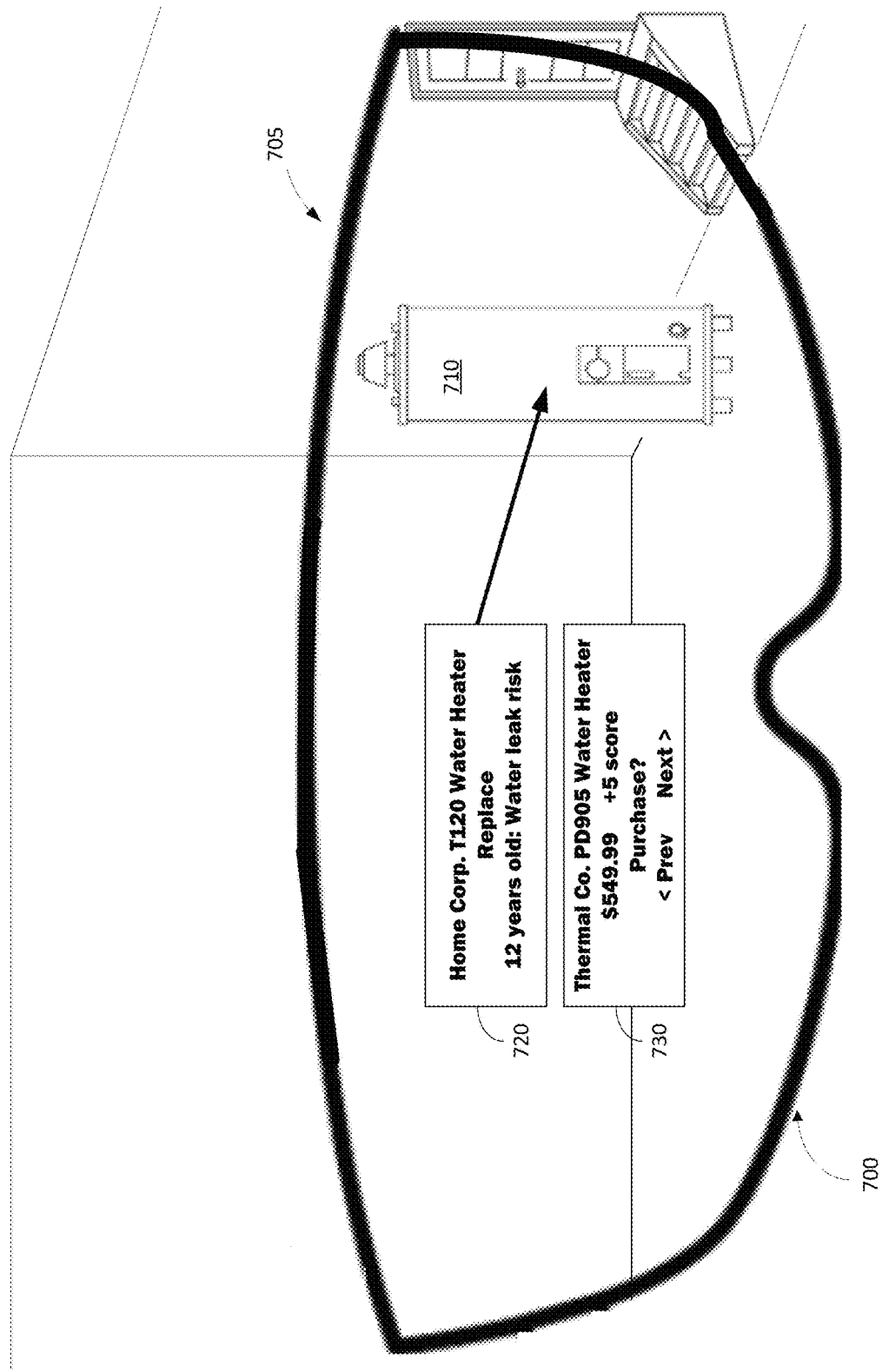
FIG. 7 depicts an exemplary AR display identifying recommended updates to devices proximate a home, according to one embodiment.

Exemplary AR Headset to Visualize Recommended Device Updates and Improved Home Scores FIG. 7 depicts an exemplary AR headset 700 displaying AR display 705 for displaying a recommended update to device proximate a home and a resulting home score improvement, according to one embodiment.

In one example according to the embodiment, a trained ML model generates one or more update recommendations and resulting home score improvements based upon existing devices information and/or underlay layer data for the home. The existing devices information and/or underlay layer data may be obtained by a user device as described herein, which may provide the existing devices information as an input to a trained ML model (such the ML model 510) to provide an indication of a recommended update to a device 710 around the home. The recommended update indication may be provided to the AR headset 700 (e.g., via server 105) as the AR display 705.

The underlay layer device of the AR headset 700, such as underlay layer device 318, may create underlay layer data from the field of view (FOV) of the user of the AR headset 700. In one aspect, the AR headset 700 may be able to recognize the existing devices 710, such as a water heater, in the FOV of the user. The AR headset 700 may recognize the existing devices 710 using machine vision, computer vision, AI, ML, or any other suitable technique. In one aspect, the AR headset may identify the existing devices 710 by comparing them to device images stored in the device dataset 600. In one aspect, the AR headset may identify the existing devices 710 by identifying a model and/or serial number on the existing devices 710. In one aspect, the AR headset 700 may receive and/or have access to overlay layer data such as structure information residing on a sever, which may include a floorplan of the house, where the existing devices 710 are located, and/or other suitable data. In one aspect, the AR headset 700 may receive and/or have access to data about the existing devices, such as existing device information 630.

In one aspect, the AR headset 700 and/or server may correlate the identified existing device 710 with a record in the existing device information 630. For example, the AR headset 700 and/or server may correlate existing device 710 with record 634, which comprises a Home Corp. T120 water heater.

In one aspect, the AR headset 700 and/or server may correlate a record in the existing device information 630 with a record in the device dataset 600 to determine recommended updates. For example, the AR headset 700 and/or server may correlate record 634 with record 622, which comprises a Home Corp. T120 water heater. The AR headset 700 and/or server may compare the age data in record 634 with the expected lifespan data in record 622. The AR headset 700 and/or server may compare the last maintenance data in record 634 with the maintenance data in record 622. The AR headset 700 and/or server may further examine the recalls data in record 622.

In one aspect, the AR headset 700 and/or server may correlate the underlay layer data with the overlay later data to create the AR display 705. The AR headset 700 and/or a server in communication with the AR headset 700, may process the underlay layer data and the overlay layer data to recognize the existing devices 710, their location, the location of the AR headset 700, and/or generate the AR display 705. The AR display 705 may be aligned appropriately with the detected existing devices 710 based upon sensor data from the AR headset 700, such as gyros, IMUs, accelerometers, GPS, or other suitable means of determining the field of view of the wearer of the AR headset 700.

The AR display 705 may include a recommended update popup message 720. The recommended update popup message 720 may include a description of the existing device 710, a category of recommended update (e.g., maintenance, reconfiguration, replacement, etc.), and an explanation of the recommended update. For example, the recommended update popup message 720 may identify the existing device 710 as a Home Corp. T120 water heater and recommend replacement of the existing device 710 due to its age exceeding its expected lifespan.

The AR display 705 may include a purchase popup message 730. The purchase popup message 730 may include a description of a replacement device, a price of the replacement device, a home score improvement, and/or an option to purchase the replacement device. Information about the replacement device may be obtained from the device dataset 600, one or more public data sources, one or more private data sources, and/or any other suitable data source. The option to purchase may comprise a hyperlink that, when selected, displays the replacement device on an online retailer website. The option to purchase may automatically purchase the replacement device when selected. The purchase popup message 730 may include a menu and/or other navigation features that allow the user to browse different models of purchase popup message 730.

In one aspect, the AR device 700 via the AR display 705 may include guidance information to inspect locations of the structure to generate update recommendations 720 proximate the structure. The guidance information may direct the user throughout the structure such as a house. The guidance information may be generated by the server, AR device 700, AI/ML generative chatbot or other suitable source. The guidance information may include visual components, audio components, and/or any other suitable multimedia to guide a user through detecting existing devices 710 proximate a structure. For example, the AR device 700 may use audio and/or text via the AR display 705 to indicate the next location, room, floor, direction of travel, etc., the user should move to for inspection. The guidance information may be based upon a location of the user determined from the underlay layer day and overlay layer data, for example identifying the room the user is in based upon the underlay layer data.

Figure 8:
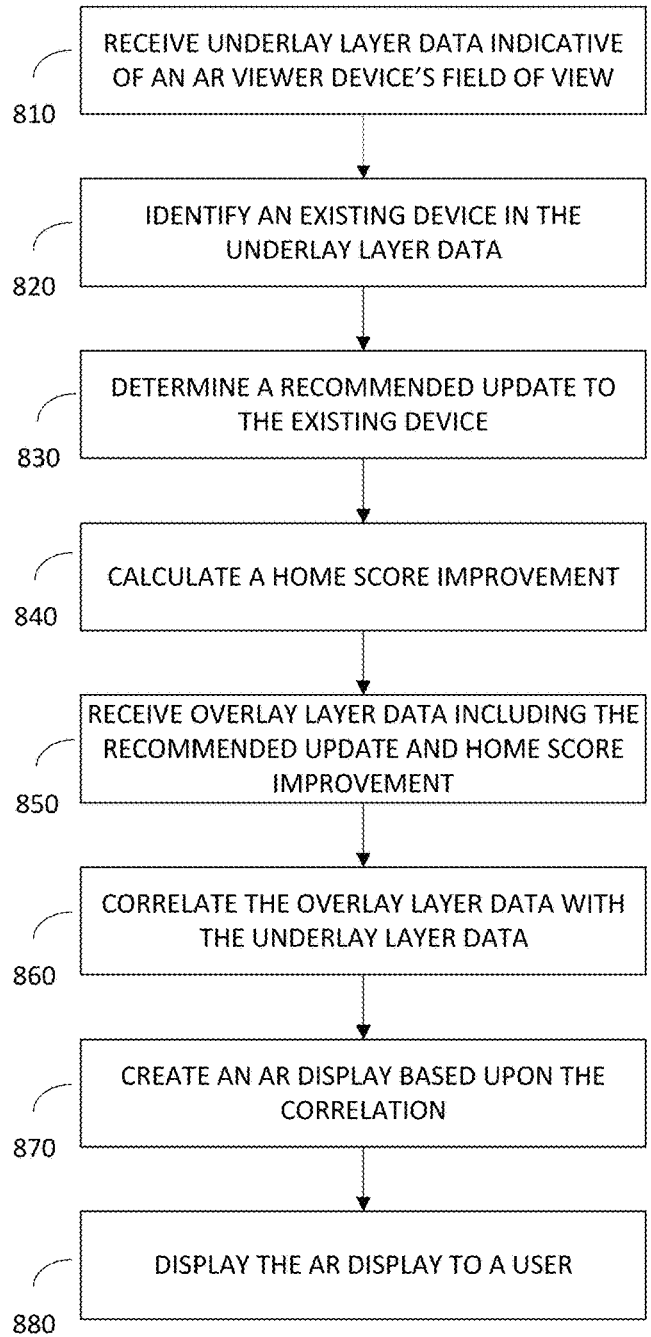
FIG. 8 depicts an exemplary computer-implemented method for providing recommended updates to devices proximate a structure.

Exemplary Computer-Implemented Method for Using AR to Visualize a Recommended Update to an Existing Device Proximate a Structure FIG. 8 depicts a flow diagram of an exemplary computer-implemented method 800 for using AR for visualizing a recommended update to an existing device proximate a structure. One or more steps of the method 800 may be implemented as a set of instructions stored on a computer-readable memory and executable on one or more processors. The method 800 of FIG. 8 may be implemented via a system, such as the server 105 and/or the mobile device 215, AR viewer device 300, and/or AR headset 700.

In one embodiment, the computer-implemented method 800 may include training an ML model (such as the ML module 140 and/or ML model 510) with a training dataset (such as training data 520) and/or validating the ML model with a validation dataset. The training dataset and/or the validation dataset may comprise historical insurance claims data and/or a device dataset.

In one embodiment, the computer-implemented method 800 may include at block 810 receiving underlay layer data indicative of a field of view associated with an AR viewer device. The field of view may comprise an existing device proximate a structure. The field of view may be generated by a camera coupled to the AR viewer device.

In one embodiment, the computer-implemented method 800 may include at block 820 identifying the existing device proximate the structure. The identification may be performed by the ML model.

In one embodiment, the computer-implemented method 800 at block 830 may include determining a recommended update to the existing device. The determination may be performed by the ML model. The recommended update may comprise replacing the existing device with one or more new devices. The recommended update may comprise reconfiguring the existing device. In one embodiment, the computer-implemented method 800 may include receiving directions for reconfiguring the existing device.

In one embodiment, the computer-implemented method 800 at block 840 may include calculating an improvement to a home score associated with the structure based upon the recommended update. The calculation may be performed by the ML model.

In one embodiment, the computer-implemented method 800 at block 850 may include receiving overlay layer data including an indication of the recommended update to the existing device and the improvement to the home score.

In one embodiment, the computer-implemented method 800 at block 860 may include correlating the overlay layer data with the underlay layer data.

In one embodiment, the computer-implemented method 800 at block 870 may include creating an AR display based upon the correlation. The AR display may include an indication of the recommended update to the existing device and the improvement to the home score. The AR display may include text and/or graphical elements describing the recommended update. The AR display may include the directions for reconfiguring the existing device.

In one embodiment, the computer-implemented method 800 at block 880 may include displaying the AR display to a user via the AR viewer device.

In one embodiment, the computer-implemented method 800 may include receiving a selection of a new device from the user. The selection may be performed using the AR viewer device. The computer-implemented method 800 may include purchasing the recommended device.

In one embodiment, the computer-implemented method 800 may include detecting the new device in the underlay data. The detection may be performed by the ML model. Responsive to detecting the new device in the underlay layer data, the computer-implemented method 800 may include updating, a record associated with the structure to indicate the placement of the new device.

It should be understood that not all blocks of the exemplary flow diagram 800 are required to be performed. Moreover, the exemplary flow diagram 800 is not mutually exclusive (i.e., block(s) from exemplary flow diagram 800 may be performed in any particular implementation).

Additional Exemplary Embodiments

In one aspect, a computer-implemented method of using Augmented Reality (AR) for visualizing a recommended update to an existing device proximate a structure may be provided. The method may be implemented via one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For instance, in one example, the method may include: (1) receiving, with one or more processors, underlay layer data indicative of a field of view associated with an AR viewer device, wherein the field of view comprises the existing device proximate the structure; (2) identifying, by a trained machine learning (ML) model using the one or more processors, the existing device in the underlay layer data; (3) determining, by the trained ML model using the one or more processors, the recommended update to the existing device; (4) calculating, by the trained ML model using the one or more processors, an improvement to a home score associated with the structure based upon the recommended update; (5) receiving, with the one or more processors, overlay layer data including an indication of the recommended update to the existing device and the improvement to the home score; (6) correlating, with the one or more processors, the overlay layer data with the underlay layer data; (7) creating, with the one or more processors, an AR display based upon the correlation, the AR display including the indication of the recommended update and the improvement to the home score; and/or (8) displaying, with the one or more processors, the AR display to a user via the AR viewer device.

In some embodiments, the underlay layer data is generated by a camera coupled to the AR viewer device.

In some embodiments, the recommended update comprises replacing the existing device with one or more new devices.

In certain embodiments, the method further may include receiving, with the one or more processors, a selection of a new device from the one or more new devices from the user via the AR viewer device; and/or purchasing, with the one or more processors, the new device. Additionally or alternatively, in some embodiments, the method further may include detecting, by the trained ML model using the one or more processors, the new device in the underlay data; and/or responsive to detecting the new device in the underlay data, updating, by the one or more processors, a record associated with the structure to indicate the placement of the new device.

In some embodiments, the recommended update comprises reconfiguring the existing device. Additionally or alternatively, in certain embodiments, the method further may include receiving, by the one or more processors, directions for reconfiguring the existing device, wherein the AR display further includes the directions for reconfiguring.

In another aspect, a computer system configured to use Augmented Reality (AR) to visualize a recommended update to an existing device proximate a structure may be provided. The computer system may include one or more local or remote processors, sensors, transceivers, servers, memory units, augmented reality glasses or headsets, virtual reality headsets, extended or mixed reality headsets, smart glasses or watches, wearables, voice bot or chatbot, ChatGPT bot, and/or other electronic or electrical components. For example, in one instance, the computer system may include one or more processors configured to: (1) receive underlay layer data indicative of a field of view associated with an AR viewer device, wherein the field of view comprises the existing device proximate the structure; (2) identify, by a trained machine learning (ML) model, the existing device in the underlay layer data; (3) determine, by the trained ML model, the recommended update to the existing device; (4) calculate, by the trained ML model, an improvement to a home score associated with the structure based upon the recommended update; (5) receive overlay layer data including an indication of the recommended update to the existing device and the improvement to the home score; (6) correlate the overlay layer data with the underlay layer data; (7) create an AR display based upon the correlation, the AR display including the indication of the recommended update and the improvement to the home score; and/or (8) display the AR display to a user via the AR viewer device.

In some embodiments, the underlay layer data is generated by a camera coupled to the AR viewer device. Additionally or alternatively, in certain embodiments, the recommended update comprises replacing the existing device with one or more new devices.

In some embodiments, the one or more processors may be further configured to: receive a selection of a new device from the one or more new devices from the user via the AR viewer device; and/or purchase the new device.

In certain embodiments, the one or more processors may be further configured to: detect, by the trained ML model, the new device in the underlay data; and/or responsive to detecting the new device in the underlay data, update a record associated with the structure to indicate the placement of the new device.

In some embodiments, the recommended update comprises reconfiguring the existing device. Additionally or alternatively, in certain embodiments, the one or more processors may be further configured to receive directions for reconfiguring the existing device, wherein the AR display further includes the directions for reconfiguring.

In another aspect, a computer readable storage medium storing non-transitory computer readable instructions for using Augmented Reality (AR) to visualize a recommended update to an existing device proximate a structure may be provided. For example, in one instance, the instructions may cause one or more processors to: (1) receive underlay layer data indicative of a field of view associated with an AR viewer device, wherein the field of view comprises the existing device proximate the structure; (2) identify, by a trained machine learning (ML) model, the existing device in the underlay layer data; (3) determine, by the trained ML model, the recommended update to the existing device; (4) calculate, by the trained ML model, an improvement to a home score associated with the structure based upon the recommended update; (5) receive overlay layer data including an indication of the recommended update to the existing device and the improvement to the home score; (6) correlate the overlay layer data with the underlay layer data; (7) calculate an improvement to a home score associated with the structure based upon the recommended update; (8) create an AR display based upon the correlation, the AR display including the indication of the recommended update and the improvement to the home score; and/or (9) display the AR display to a user via the AR viewer device.

In some embodiments, the recommended update comprises replacing the existing device with one or more new devices.

In some embodiments, the instructions may further cause the one or more processors to receive a selection of a new device from the one or more new devices from the user via the AR viewer device; and/or purchase the new device. Additionally or alternatively, in certain embodiments, the instructions may further cause the one or more processors to detect, by the trained ML model, the new device in the underlay data; and/or responsive to detecting the new device in the underlay data, update a record associated with the structure to indicate the placement of the new device.

In some embodiments, the recommended update comprises reconfiguring the existing device. Additionally or alternatively, in certain embodiments, the instructions may further cause the one or more processors to receive directions for reconfiguring the existing device, wherein the AR display further includes the directions for reconfiguring.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method of using Augmented Reality (AR) for visualizing a recommended update to an existing device proximate a structure, the method comprising:
    receiving, with one or more processors, underlay layer data indicative of a field of view associated with an AR viewer device, wherein the field of view comprises the existing device proximate the structure;
    identifying, by a trained machine learning (ML) model using the one or more processors, the existing device in the underlay layer data;
    determining, by the trained ML model using the one or more processors, the recommended update to the existing device;
    calculating, by the trained ML model using the one or more processors, an improvement to a home score associated with the structure based upon the recommended update;
    receiving, with the one or more processors, overlay layer data including an indication of the recommended update to the existing device and the improvement to the home score;
    correlating, with the one or more processors, the overlay layer data with the underlay layer data;
    creating, with the one or more processors, an AR display based upon the correlation, the AR display including the indication of the recommended update and the improvement to the home score; and
    displaying, with the one or more processors, the AR display to a user via the AR viewer device.

2. The computer-implemented method of claim 1, wherein the underlay layer data is generated by a camera coupled to the AR viewer device.

3. The computer-implemented method of claim 1, wherein the recommended update comprises replacing the existing device with one or more new devices.

4. The computer-implemented method of claim 3, further comprising:
    receiving, with the one or more processors, a selection of a new device from the one or more new devices from the user via the AR viewer device; and
    purchasing, with the one or more processors, the new device.

5. The computer-implemented method of claim 4, further comprising:
    detecting, by the trained ML model using the one or more processors, the new device in the underlay data; and
    responsive to detecting the new device in the underlay data, updating, by the one or more processors, a record associated with the structure to indicate the placement of the new device.

6. The computer-implemented method of claim 1, wherein the recommended update comprises reconfiguring the existing device.

7. The computer-implemented method of claim 6 further comprising:
    receiving, by the one or more processors, directions for reconfiguring the existing device,
    wherein the AR display further includes the directions for reconfiguring.

8. A computer system configured to use Augmented Reality (AR) to visualize a recommended update to an existing device proximate a structure, the computer system comprising:
    one or more processors; and
    one or more non-transitory memories storing processor-executable instructions that, when executed by the one or more processors, cause the system to:
        receive underlay layer data indicative of a field of view associated with an AR viewer device, wherein the field of view comprises the existing device proximate the structure;
        identify, by a trained machine learning (ML) model, the existing device in the underlay layer data;
        determine, by the trained ML model, the recommended update to the existing device;
        calculate, by the trained ML model, an improvement to a home score associated with the structure based upon the recommended update;

receive overlay layer data including an indication of the recommended update to the existing device and the improvement to the home score;

correlate the overlay layer data with the underlay layer data;

create an AR display based upon the correlation, the AR display including the indication of the recommended update and the improvement to the home score; and display the AR display to a user via the AR viewer device.

9. The computer system of claim 8, wherein the underlay layer data is generated by a camera coupled to the AR viewer device.

10. The computer system of claim 8, wherein the recommended update comprises replacing the existing device with one or more new devices.

11. The computer system of claim 10, wherein the instructions, when executed by the one or more processors, further cause the system to:

receive a selection of a new device from the one or more new devices from the user via the AR viewer device; and purchase the new device.

12. The computer system of claim 11, wherein the instructions, when executed by the one or more processors, further cause the system to:

detect, by the trained ML model, the new device in the underlay data; and responsive to detecting the new device in the underlay data, update a record associated with the structure to indicate the placement of the new device.

13. The computer system of claim 8, wherein the recommended update comprises reconfiguring the existing device.

14. The computer system of claim 13, wherein the instructions, when executed by the one or more processors, further cause the system to:

receive directions for reconfiguring the existing device, wherein the AR display further includes the directions for reconfiguring.

15. A non-transitory computer readable storage medium storing computer readable instructions for using Augmented Reality (AR) to visualize a recommended update to an existing device proximate a structure, wherein the instructions when executed on one or more processors cause the one or more processors to:

receive underlay layer data indicative of a field of view associated with an AR viewer device, wherein the field of view comprises the existing device proximate the structure;

identify, by a trained machine learning (ML) model, the existing device in the underlay layer data;

determine, by the trained ML model, the recommended update to the existing device;

calculate, by the trained ML model, an improvement to a home score associated with the structure based upon the recommended update;

receive overlay layer data including an indication of the recommended update to the existing device and the improvement to the home score;

correlate the overlay layer data with the underlay layer data;

calculate an improvement to a home score associated with the structure based upon the recommended update;

create an AR display based upon the correlation, the AR display including the indication of the recommended update and the improvement to the home score; and display the AR display to a user via the AR viewer device.

16. The computer readable storage medium of claim 15, wherein the recommended update comprises replacing the existing device with one or more new devices.

17. The computer readable storage medium of claim 16, wherein the instructions, when executed by the one or more processors, further cause the one or more processors to:

receive a selection of a new device from the one or more new devices from the user via the AR viewer device; and purchase the new device.

18. The computer readable storage medium of claim 17, wherein the instructions, when executed by the one or more processors, further cause the one or more processors to:

detect, by the trained ML model, the new device in the underlay data; and responsive to detecting the new device in the underlay data, update a record associated with the structure to indicate the placement of the new device.

19. The computer readable storage medium of claim 15, wherein the recommended update comprises reconfiguring the existing device.

20. The computer readable storage medium of claim 19, wherein the instructions, when executed by the one or more processors, further cause the one or more processors to:

receive directions for reconfiguring the existing device, wherein the AR display further includes the directions for reconfiguring.

* * * * *